(12) United States Patent  
Hansen

(10) Patent No.: US 9,164,494 B2
(45) Date of Patent: Oct. 20, 2015

(54) SPORTS TIMING SYSTEM (STS) INTEGRATED COMMUNICATION SYSTEM AND METHOD

(75) Inventor: Kurt S. Hansen, Chesterfield, MO (US)

(73) Assignee: Innovation Timing Systems, LLC, St. Louis, MO (US)

(*) Notice: Subject to any disclaimer, the term of this patent is extended or adjusted under 35 U.S.C. 154(b) by 0 days.

(21) Appl. No.: 13/521,700

(22) PCT Filed: Jan. 11, 2011

(86) PCT No.: PCT/US2011/020901
§ 371 (c)(1),
(2), (4) Date: Jul. 11, 2012

(87) PCT Pub. No.: WO2011/085405
PCT Pub. Date: Jul. 14, 2011

(65) Prior Publication Data
US 2012/0303753 A1    Nov. 29, 2012

Related U.S. Application Data

(60) Provisional application No. 61/294,024, filed on Jan. 11, 2010, provisional application No. 61/369,013, filed on Jul. 29, 2010.

(51) Int. Cl.
G06F 15/16    (2006.01)
G04G 21/04    (2013.01)
(Continued)

(52) U.S. Cl.
CPC ............ *G04G 21/04* (2013.01); *A63B 24/0021* (2013.01); *A63B 71/0616* (2013.01);
(Continued)

(58) Field of Classification Search
None
See application file for complete search history.

(56) References Cited

U.S. PATENT DOCUMENTS 4,142,680 A    3/1979    Oswald et al.
4,505,595 A    3/1985    Rose et al.
(Continued)

FOREIGN PATENT DOCUMENTS

EP    2009595 A    12/2008
JP    2008-276353 A    11/2006
(Continued)

OTHER PUBLICATIONS

Johnston, James. "Work in Progress: RFID Sports Timing System." Work 1: Jan. 2008.*
(Continued)

*Primary Examiner* — Chris Parry
*Assistant Examiner* — Caroline Jahnige
(74) *Attorney, Agent, or Firm* — Polster Lieder

(57) ABSTRACT

Systems and methods for an integrated communication system for sports timing systems having a data interface, a memory and a processor. The data interface is for communicating over a data communication network. The memory includes executable instructions for operating the data interface to communicate over the data communication network and for storing participant data including participant data that includes a participant identifier for uniquely identifying each participant and participant timing data. The processor is coupled to the memory and the data interface and executes the executable instructions for operating the data interface to transmit datagram messages over a stateless packet data communication network wherein the datagram messages include multicast and unicast messages, each of which includes at least a portion of the participant data.

42 Claims, 8 Drawing Sheets

(51) Int. Cl.
  *A63B 24/00* (2006.01)
  *A63B 71/06* (2006.01)
  *G06Q 50/22* (2012.01)
  *G07C 1/22* (2006.01)

(52) U.S. Cl.
  CPC  *G06Q50/22* (2013.01); *G07C 1/22* (2013.01); *A63B 2220/62* (2013.01); *A63B 2225/15* (2013.01); *A63B 2225/20* (2013.01); *A63B 2225/50* (2013.01); *A63B 2225/54* (2013.01)

(56)  References Cited

U.S. PATENT DOCUMENTS

| | | | |
|---|---|---|---|
| 4,588,881 A * | 5/1986 | Pejas et al. | 235/385 |
| 4,812,845 A | 3/1989 | Yamada et al. | |
| 4,918,630 A | 4/1990 | Plouff et al. | |
| 5,091,895 A | 2/1992 | Chatwin et al. | |
| 5,140,307 A | 8/1992 | Rebetez et al. | |
| 5,436,611 A * | 7/1995 | Arlinghaus, Jr. | 340/323 R |
| 5,493,805 A | 2/1996 | Penuela et al. | |
| 5,511,045 A | 4/1996 | Sasaki et al. | |
| 5,604,485 A | 2/1997 | Lauro et al. | |
| 5,696,481 A | 12/1997 | Pejas et al. | |
| 5,812,049 A | 9/1998 | Uzi | |
| 5,821,902 A | 10/1998 | Keen | |
| 5,854,454 A * | 12/1998 | Upender et al. | 187/247 |
| 5,883,582 A | 3/1999 | Bowers et al. | |
| 5,973,598 A | 10/1999 | Beigel | |
| 6,008,773 A | 12/1999 | Matsuoka et al. | |
| 6,100,804 A | 8/2000 | Brady et al. | |
| 6,204,813 B1 * | 3/2001 | Wadell et al. | 342/463 |
| 6,278,413 B1 | 8/2001 | Hugh et al. | |
| 6,340,932 B1 | 1/2002 | Rodgers et al. | |
| 6,369,697 B1 | 4/2002 | Poole | |
| 6,466,178 B1 | 10/2002 | Muterspaugh | |
| 6,496,806 B1 | 12/2002 | Horwitz et al. | |
| 6,512,478 B1 | 1/2003 | Chien | |
| 6,570,487 B1 | 5/2003 | Steeves | |
| 6,577,238 B1 | 6/2003 | Whitesmith et al. | |
| 6,696,954 B2 | 2/2004 | Chung | |
| 6,703,935 B1 | 3/2004 | Chung et al. | |
| 6,710,713 B1 | 3/2004 | Russo | |
| 6,720,930 B2 | 4/2004 | Johnson et al. | |
| 6,812,824 B1 | 11/2004 | Goldinger et al. | |
| 6,839,027 B2 | 1/2005 | Krumm et al. | |
| 6,888,459 B2 | 5/2005 | Stilp | |
| 6,888,502 B2 | 5/2005 | Beigel et al. | |
| 6,952,157 B1 | 10/2005 | Stewart et al. | |
| 6,963,270 B1 | 11/2005 | Gallagher, III et al. | |
| 6,989,750 B2 | 1/2006 | Shanks et al. | |
| 6,995,655 B2 | 2/2006 | Ertin et al. | |
| 7,009,562 B2 | 3/2006 | Jenabi | |
| 7,019,639 B2 | 3/2006 | Stilp | |
| 7,057,511 B2 | 6/2006 | Shanks et al. | |
| 7,057,975 B2 | 6/2006 | Stobbe | |
| 7,339,478 B2 | 3/2008 | Le | |
| 7,508,739 B2 | 3/2009 | Paes | |
| 7,579,946 B2 * | 8/2009 | Case, Jr. | 340/539.1 |
| 7,589,616 B2 | 9/2009 | Klatsmanyi et al. | |
| 7,605,685 B2 | 10/2009 | Stewart et al. | |
| 7,605,689 B2 | 10/2009 | Hein et al. | |
| 8,085,136 B2 | 12/2011 | Stewart et al. | |
| 8,179,233 B2 | 5/2012 | Kia | |
| 2001/0040895 A1 * | 11/2001 | Templin | 370/466 |
| 2002/0008624 A1 | 1/2002 | Paek | |
| 2002/0044057 A1 | 4/2002 | Zirbes | |
| 2002/0044096 A1 | 4/2002 | Chung | |
| 2003/0014678 A1 * | 1/2003 | Ozcetin et al. | 713/400 |
| 2003/0073518 A1 | 4/2003 | Marty et al. | |
| 2003/0163287 A1 | 8/2003 | Vock et al. | |
| 2003/0189484 A1 | 10/2003 | Rust et al. | |
| 2004/0006445 A1 | 1/2004 | Paek | |
| 2004/0104845 A1 * | 6/2004 | McCarthy | 342/463 |
| 2005/0099269 A1 | 5/2005 | Diorio et al. | |
| 2005/0120378 A1 * | 6/2005 | Jalonen | 725/97 |
| 2006/0097847 A1 | 5/2006 | Bervoets et al. | |
| 2006/0097874 A1 | 5/2006 | Salesky et al. | |
| 2006/0103536 A1 | 5/2006 | Kwak et al. | |
| 2006/0176216 A1 | 8/2006 | Hipskind | |
| 2007/0076528 A1 | 4/2007 | Kirby | |
| 2007/0097969 A1 * | 5/2007 | Regnier | 370/390 |
| 2007/0150570 A1 * | 6/2007 | Eastham | 709/223 |
| 2007/0182567 A1 * | 8/2007 | Stewart et al. | 340/572.8 |
| 2007/0252770 A1 | 11/2007 | Kai et al. | |
| 2007/0254619 A1 * | 11/2007 | Salomone et al. | 455/343.2 |
| 2007/0262871 A1 | 11/2007 | Yamagajo et al. | |
| 2007/0272011 A1 | 11/2007 | Chapa, Jr. et al. | |
| 2008/0018479 A1 | 1/2008 | Hashimoto et al. | |
| 2008/0021676 A1 | 1/2008 | Vock et al. | |
| 2008/0111695 A1 | 5/2008 | Yamagajo et al. | |
| 2008/0143620 A1 | 6/2008 | Khatri | |
| 2008/0246615 A1 | 10/2008 | Duron et al. | |
| 2008/0246616 A1 | 10/2008 | Sakama et al. | |
| 2008/0284654 A1 | 11/2008 | Burnside et al. | |
| 2008/0316032 A1 | 12/2008 | Kia | |
| 2009/0015377 A1 | 1/2009 | Fogg et al. | |
| 2009/0184806 A1 | 7/2009 | Kia | |
| 2009/0231198 A1 | 9/2009 | Walsh et al. | |
| 2009/0284368 A1 | 11/2009 | Case, Jr. | |
| 2010/0019897 A1 | 1/2010 | Stewart et al. | |
| 2010/0051701 A1 | 3/2010 | Ogata et al. | |
| 2010/0088023 A1 | 4/2010 | Werner | |
| 2010/0153827 A1 * | 6/2010 | Koster et al. | 714/799 |
| 2010/0295943 A1 | 11/2010 | Cha et al. | |
| 2010/0302910 A1 * | 12/2010 | Howell | 368/10 |
| 2011/0038369 A1 * | 2/2011 | Lee et al. | 370/389 |
| 2011/0054792 A1 | 3/2011 | McClellan | |
| 2011/0141221 A1 * | 6/2011 | Satterlee et al. | 348/14.08 |
| 2011/0295807 A1 * | 12/2011 | Bernbo et al. | 707/634 |
| 2011/0298583 A1 | 12/2011 | Libby et al. | |
| 2012/0115557 A1 | 5/2012 | Kia | |
| 2012/0230240 A1 * | 9/2012 | Nebat et al. | 370/312 |
| 2014/0052279 A1 | 2/2014 | Van Rens | |

FOREIGN PATENT DOCUMENTS

| | | |
|---|---|---|
| JP | 4394600 A | 10/2009 |
| JP | 2010-088886 A | 4/2010 |
| KR | 10-2006-0078335 A | 7/2006 |
| KR | 10-2007-0092982 A | 9/2007 |
| KR | 10-2008-0090269 A | 10/2008 |
| KR | 10-2010-0100500 A | 9/2010 |
| WO | WO 2007136400 A1 * | 11/2007 |

OTHER PUBLICATIONS

PCT Search Report, PCT US 2010-022559, Jan. 29, 2010.
PCT Search Report, PCT US 2011-026717, Mar. 1, 2011.
Electronic Product Code (EPC) Tag Data Standards Version 1.1 Rev. 1.24; EPC Global, Inc. Apr. 1, 2004.
Integration of RFID and Cellular Technologies, UCLA, WINMEC 2004; Karali, Sep. 2004.
Alien Debuts Gen 2 Interrogator, RFID Journal; O'Connor, Aug. 4, 2005.
Antenna Design for UHF RFID Tags: A Review and a Practical Application, IEEE Transactions on Antennas and Propagation, vol. 53, No. 12; Rao and Nikitin, Dec. 2005.
Electronic Product Code (EPC) Radio-Frequency Indentity Protocols Class-1 Generation-2 UHF FRID Protocol for Communications at 860 MHz-960 Mhz, Version 1.0.9; EPC Global, Inc., Jan. 2005.
Electronic Product Code (EPC) Generation 1 Tag Data Standards Version 1.1 Rev.1.27; EPC Global, Inc., May 10, 2005.
UHF Gen 2 System Overview, TI-RFID; Texas Instruments, Mar. 2005.
Trolleyponder/Ecotag RFID Newsletter, No. 51; Trolley Scan Pty Ltd, Jan. 5, 2006.
Tests on Timing Module for Sports Timing; Trolley Scan Pty, Jun. 2004.
New for 2005—BEST Racing now uses DAG chip timing; DAG 2005.
Intermec RFID System Manual; Intermec 2005.
RFID Primer; Alien Technology, 2004.

(56) References Cited

OTHER PUBLICATIONS

DAG System Instructions, Version 4; Pygma Lyon (DAG), Jul. 9, 2004.
DAG System Instructions—DAG Triathlon, Version 5; Pygma Lyon (DAG) Jul. 23, 2004.
DAG System—Badgeur V2 Sport Version Datasheet; Pygma Lyon (DAG), Jul. 19, 2004.
Alien RFID Academy Training Manual; Alien Technology, Sep. 22, 2004.
Alien Advanced RFID Academy; Alien Technology, Mar. 16, 2005.
Reader Interface Guide, V2.1.0; Alien Technology, 2004.
Mobile RFID Reader with Database Wireless Synchronization, S. Sandoval-Reyes, et al, 2nd ICEEE and CIE2005, Mexico City, Sep. 7-9, 2005.
Tag Programming Guide, Nanoscanner Reader v01.02.01, Alien Technology, 2003.
Mitigating the Reader Collision Problem in RFID Networks with Mobile Readers, Shailesh M. Birair and Sridhar Iyer, Indian Institute of Technology, Mumbai, India, 400 076, IEEE, 2005.
PCT Search Report, PCT US 2011-020901, Jan. 11, 2011.
PCT Search Report, PCT US 2011-020905, Jan. 11, 2011.
PCT Search Report, PCT US 2011-046032, Jul. 20, 2011.
PCT Search Report, PCT US 2011-050570, Sep. 6, 2011.

* cited by examiner

Message Type | Source | Custom 1 | Custom 2 | Custom N | EOM |

Definitions for each field in the Information Packet Structure

Message Type  - Indicator for the type of message being sent
Source  - The name or ID of the transmitting system
Custom 1...N  - Variable length field containing user-defined data
EOM  - Indicator placed at the end of the information packet
|  - Separator used between each field of information within the packet, as well as at the end of an information packet

Fig. 4

(A) - ANNC|FROM|BIB#|NAME|AGE|GENDER|CITY|TIME|PACKET#|EOM|

(B) - REANNC|FROM|DEST|PACKET#|EOM|

(C) - NOANNC|FROM|0|0|M|0|PACKET#|EOM|

(D) - READ|FROM|TAGSERIALNUMBER|TIME|PACKET#|EOM|

(E) - READ|FROM|PARTICIPANTNAME|TIME|PACKET#|EOM|

(F) - RESEND|FROM|DESTINATION|PACKET#|EOM|

(G) - TSYNC|FROM|TIME|EOM|

(H) - LOOKUP|FROM|IDENTIFIER|PACKET#|EOM|

(I) - STARTRFID|FROM|DEST|TIME|PACKET#|EOM|

(J) - STOPRFID|FROM|DEST|TIME|PACKET#|EOM|

(K) – COMMAND|FROM|DEST|IDENTIFIER|PACKET#|EOM|

(L) – ANNCM|BIB #|MESSAGE|EOM|

(M) – TRSTART|TIME|EOM|

(N) – ANNCL|FROM|BIB#|NAME|AGE|GENDER|CITY|TOTAL LAPS|TIME|TEAM NAME|PACKET#|EOM|

(O) – RSIG|FROM|TIME|EOM|

(P) – KREFRESH|FROM|BIB#|NAME|AGE|GENDER|CITY|TIME|PACKET#|EOM|

(Q) –RQIMAGE|FROM|DEST|IDENTIFIER|COMPRESSION|PACKETSIZE|PSOCKET|PACKET #|EOM|

(R) – STIMAGE|FROM|DEST|IDENTIFIER|COMPRESSION|PACKETSIZE|PSOCKET|PACKET #|EOM|

(S) – RQIDIR|FROM|DEST|IDENTIFIER|PACKET #|EOM|

(T) – STIDIR|FROM|DEST|FILELIST|PACKET #|EOM|

(U) – RQISTREAMON|FROM|DEST|IDENTIFIER|COMPRESSION|PACKETSIZE|PSOCKET|TIMEOUT|PACKET#|EOM|

(V) – RQISTREAMOFF|FROM|DEST|IDENTIFIER|PSOCKET|PACKET #|EOM|

Fig. 5

SPORTS TIMING SYSTEM (STS) INTEGRATED COMMUNICATION SYSTEM AND METHOD

CROSS-REFERENCE TO RELATED APPLICATIONS

This application is a United States national phase under 35 USC §371 of PCT/US2011/20901, filed Jan. 11, 2011, which claims the benefit of U.S. Provisional Application No. 61/294,024, filed on Jan. 11, 2010, entitled RFID SPORTS TIMING COMMUNICATIONS SYSTEMS AND METHODS; and U.S. Provisional Application No. 61/369,013, filed on Jul. 29, 2010, AUTOMATED TIMING SYSTEMS AND METHODS HAVING MULTIPLE TIME EVENT RECORDERS AND AN INTEGRATED USER TIME ENTRY INTERFACE.

The disclosures of the above applications are incorporated herein by reference.

FIELD

The present disclosure relates to a sporting event system and, more specifically, to a communication system and method for a sport timing system.

BACKGROUND

The statements in this section merely provide background information related to the present disclosure and may not constitute prior art.

When using an RFID system or similar detection technology system for timing sporting events, it often becomes necessary to share information coming from one or more systems. This information might include, but is not limited to, the following: participant/RFID tag serial number, participant/RFID tag read time, name of a participant, age of a participant, gender of a participant, name or serial number of the transmitting system, destination name or serial number of the receiving system, sequence number for the packet of information being transmitted from the transmitting to the receiving system, or the current time on a given system.

As such, there is a need for providing common communications between various components and systems of one or more sports timing systems.

SUMMARY

The inventor hereof has succeeded at designing a sports timing communications systems and methods that can, in some embodiments, facilitate and/or streamline the communication of timing information between multiple computers used at sporting events. The sports timing system (STS) integrated communication system (ICS) as described herein provides for the transmission of information using variable length messages that can be customized by an STS user and the enablement of multiple application services. The information can be transmitted via numerous technologies including, but not limited to, wired networks, wireless networks, satellite networks, cellular networks, serial networks, or private virtual networks. The information is sent in a packet structure with message type indicators at the beginning of the packet, and an end of packet identifier that tells the receiving system that all information for that particular packet has been received. These indicators make it possible to parse individual information packets that are being received in a constant stream. The contents of the information packets follow a pre-defined format. However, the Sports Timing Communications Protocol is expansive and allows the creation of new information packets to accommodate unique needs.

The STS-ICS herein provides a very suitable solution for communicating between multiple STS systems as well as sport timing auxiliary systems (STAS) in which auxiliary applications can provide vertical applications utilizing the information available within the STS-ICS system and methods.

In one aspect, a system for communicating sporting event timing information among a plurality of sports timing systems, the system comprising a sport timing system (STS) having a data interface, a memory and a processor. The data interface is for communicating over a data communication network. The memory includes executable instructions for operating the data interface to communicate over the data communication network and for storing participant data including participant data that includes a participant identifier for uniquely identifying each participant and participant timing data. The processor is coupled to the memory and the data interface and executes the executable instructions for operating the data interface to transmit datagram messages over a stateless packet data communication network wherein the datagram messages include multicast and unicast messages, each of which includes at least a portion of the participant data.

In another aspect, a system for communicating in real time sporting event timing information with a sport timing system (STS) having a participant detection system for the detecting a participant's proximity to an event detection point and determining a time associated with said detection and the sports timing system having a unique STS identifier. The system comprising a processor, a memory and a data interface. The processor configured for executing computer executable instructions. The memory storing the computer executable instructions and the unique STS identifier and coupled to the processor for providing the computer executable instructions to the processor. The computer executable instructions include a database application for storing a plurality of participant data in the memory wherein each participant data including a participant identifier for uniquely identifying each participant, and a participant timing data that includes the determined time of detection of the participant in proximity to the event detection point. The data interface is coupled to the processor and memory. The computer executable instructions causing the data interface to communicate over a data communication network using a stateless broadcast protocol for communicating a plurality of predefined multicast and unicast messages, each predefined message including at least a portion of the participant data.

In yet another aspect, a nontransitory computer readable medium encoded with a set of executable instructions for enabling a data interface of a sports timing system for communication over a coupled data communication network to cause a computer for storing in a memory participant data including participant data that includes a participant identifier for uniquely identifying each participant and participant timing data and transmitting, via a data interface, datagram messages over a stateless packet data communication network, datagram messages including multicast and unicast messages including at least a portion of the participant data.

In still another aspect, a method for communicating sporting event timing information between a first sport timing system and a second sport timing system, wherein at least one of the sport timing systems includes a participant detection system for detecting the proximity of a participant in a sporting event to an event demarcation point. The method comprising storing in a memory participant data including participant data that includes a participant identifier for uniquely identifying each participant and participant timing data and transmitting, via a data interface, datagram messages over a stateless packet data communication network, datagram messages including multicast and unicast messages including at least a portion of the participant data.

Further aspects of the present disclosure will be in part apparent and in part pointed out below. It should be understood that various aspects of the disclosure may be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

FIG. 4 is an illustration of the format for the Variable Length Message Information Packet Structure according to one exemplary embodiment.

FIG. 5 is an illustration of the format for the Pre-Defined Information Message according to one exemplary embodiment.

It should be understood that throughout the drawings, corresponding reference numerals indicate like or corresponding parts and features.

DETAILED DESCRIPTION

Figure 1:
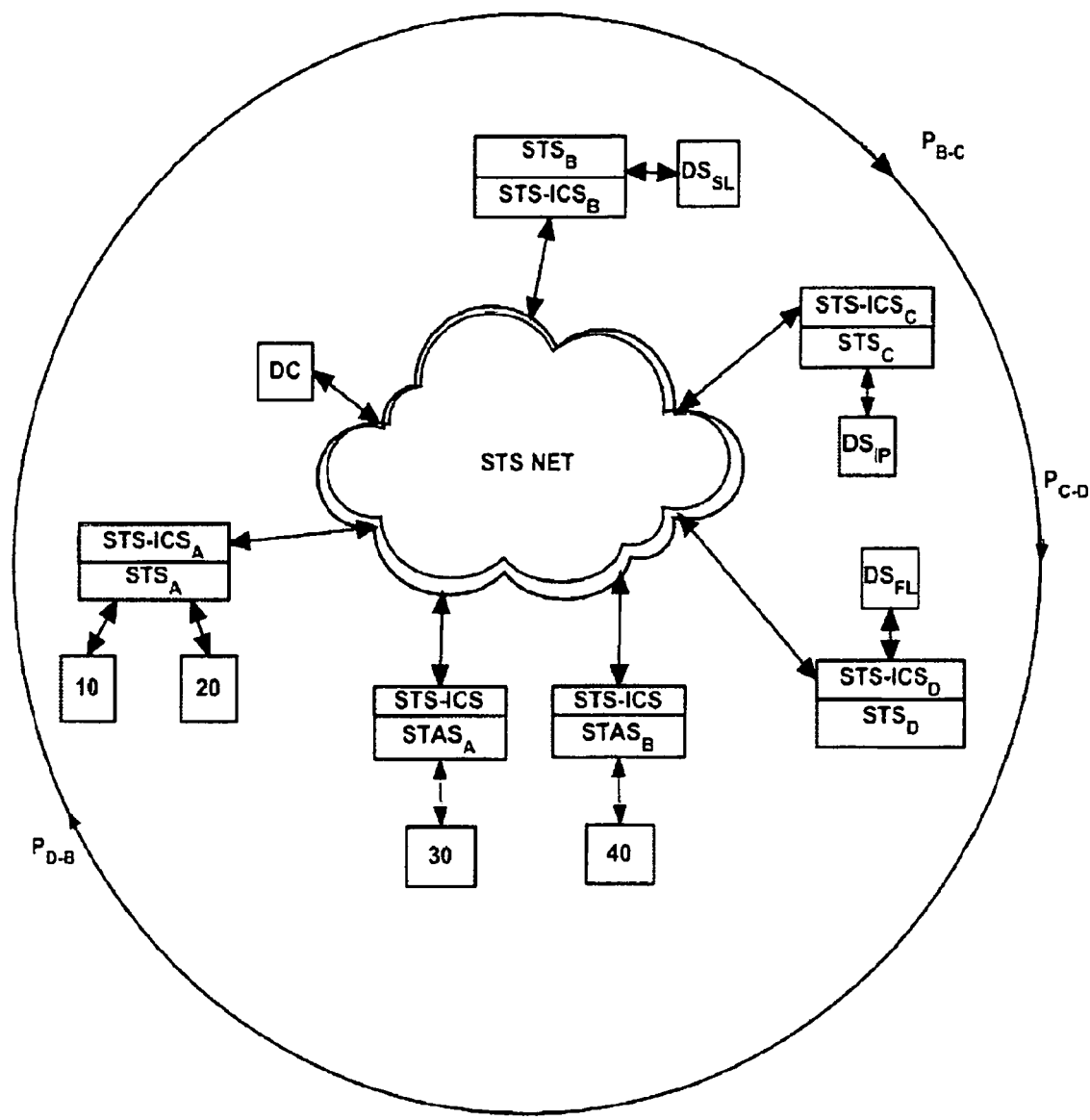
FIG. 1 is a schematic drawing showing the system architecture of the sports timing system (STS) integrated communication system (ICS), according to one exemplary embodiment.

The following description is merely exemplary in nature and is not intended to limit the present disclosure or the disclosure's applications or uses.

Before turning to the figures and the various exemplary embodiments illustrated therein, a detailed overview of various embodiments and aspects is provided for purposes of breadth of scope, context, clarity, and completeness.

The Sports Timing System (STS) Integrated Communications System (ICS) and methods support the transmission of information using variable length messages that can be customized by an STS user. The information can be transmitted via numerous technologies including, but not limited to, wired networks, wireless networks, satellite networks, cellular networks, serial networks, or private networks. The messages can be transmitted over any type of network communications protocol including, but not limited to, TCP/IP or UDP. The protocol uses a plain text message format that can be modified to include any number of new message types. A number of pre-defined messages are available for the transmission of typical sports timing information between systems. In addition, new messages can be added by utilizing a packet structure containing message type indicators at the beginning of the packet, and the EOM| end of message identifier that tells the receiving system that all information for that particular packet has been received. These indicators make it possible to parse individual information packets that are being received in a constant stream. The contents of the information packets use a variable length text message format. There are pre-defined messages for handling many of the common information exchanges often used in sports timing.

In addition, the STS-ICS is expansive and allows the creation of new information packets to accommodate unique needs. The message type indicator at the beginning of the information packet can be anything desired and should have at least one text character. The end of the information packet should always contain an EOM| indicator to ensure that the end of packet can be identified by a receiving system. In addition, the | character should be used to indicate the end of each field within the information packet. There are no limits on the length of a field within the information packet. Thus, the system could transmit significant amounts of information within a single packet. The STS-ICS is a stateless design which permits any system to communicate with any other device or system without having to establish a permanent connection.

While the STS-ICS was designed for sporting events, it could be used for any number of other applications. Furthermore, while the STS-ICS will be described in conjunction with the current embodiments, it will be understood that they are not intended to limit the protocol to these embodiments. On the contrary, the design solution intended to cover alternatives, modifications and equivalents, which may be included within the spirit and scope of the design solution.

In one exemplary embodiment, a system for communicating sporting event timing information among a plurality of sports timing systems, the system comprising a sport timing system (STS) having a data interface, a memory and a processor. The data interface is for communicating over a data communication network. The memory includes executable instructions for operating the data interface to communicate over the data communication network and for storing participant data including participant data that includes a participant identifier for uniquely identifying each participant and participant timing data. The participant identifier can be a bib number or a participant identification number for example.

The processor is coupled to the memory and the data interface and executes the executable instructions for operating the data interface to transmit datagram messages over a stateless packet data communication network wherein the datagram messages include multicast and unicast messages, each of which includes at least a portion of the participant data. The stateless packet datagram message protocol can be a user datagram protocol (UDP) in one exemplary embodiment, but can be other such protocols in other embodiments and for use on other stateless packet data communication networks. In some embodiments, a portion of the predefined message can include a uniquely assigned packet number that is a next sequential number for that particular data interface.

As shall be discussed a plurality of STS systems and STS auxiliary systems (referred herein as STAS) can implement the described STS-ICS network interface systems and method. In some embodiments, a single event will include a few to as many as a dozen or more STS systems such as for a cross country race or multi-kilometer bicycle or triathlon, each of which when implementing the STS-ICS system can share event and individual participant data. Often in such STS systems, a single system will act as the primary or master for compiling the final race results for each participant. However the other STS systems cooperate to provide race timing services and support such as racer registration, start times, intermediate detections and times, by way of example. As such, as will be described in some embodiments herein, a first and second sports timing system (STS) is possible, but such systems can have multiple first or second such STS systems and still be within the scope of the present disclosure. As such, each of the above may be a first STS system and a second STS system will have second components. However, each will access the same or coupled data communication network using the stateless broadcast protocol using the plurality of predefined multicast and unicast messages including the portion of the participant data.

Of course, one or more of the STS systems may have a timing clock that provides a present time signal. A second data interface can provide for the receiving of participant detection data from a tag reader or other detection system when the detection system detects proximity of a participant in the sporting event to a predefined detection point associated therewith or monitored by such detection system. Generally, executable instructions in the STS-ICS provide the processor with the ability to determine the participant timing data responsive to the received participant detection data and the present time signal. These components may be separate components with separate processors, memories and data interfaces or may be assembled as a single unit.

As known, each detection system, such as an RFID tag reader system by way of example, can have one or more RFID tag readers. When detecting RFID tags, the RFID reader detection systems detect the RFID tag number uniquely assigned to the detected participant and this can become the participant identification and included in participant data.

As noted and described in detail below, the multicast messages include an identification of an originating STS system but do not include an identification of an intended receiving STS system. In other words, the recipient knows who sent the message but any listening device can receive the message based on their screening on the sender. Such, multicast messages can include one or more of the later descried messages: ANNC, ANNCL, READ, NOANNC, TSYNC, RSIG, and KREFRESH, by ways of example and not intending to be limited thereto. Similarly, the unicast messages include both an identification of an originating STS system and an identification of an intended receiving STS system, and as such are a point to point message that is transmitted within the broadcasting message structure. The unicast messages can be, for example, message such as will subsequently be described to include, but not limited to, REANNC, RESEND, LOOKUP, STARTRFID, STOPRFID, COMMAND, RQIMAGE, STIMAGE, RQIDIR, STIDIR, RQIDTREAMON, and RQISTREAMOFF.

In addition to the multicast and the unicast messages, the data interface can communicate using the stateless broadcast protocol by one or more broadcast messages that do not include an identification of an originating STS system or an identification of an intended receiving STS system, and therefore are purely broadcast messages. These can include messages such as system level messages and can include the ANNCM and TRSTART messages by way of example as will be further described herein.

In another embodiment, a system for communicating in real time sporting event timing information with a sport timing system (STS) having a participant detection system for the detecting a participant's proximity to an event detection point and determining a time associated with said detection and the sports timing system having a unique STS identifier. The system comprising a processor, a memory and a data interface. The processor configured for executing computer executable instructions. The memory storing the computer executable instructions and the unique STS identifier and coupled to the processor for providing the computer executable instructions to the processor. The computer executable instructions include a database application for storing a plurality of participant data in the memory wherein each participant data including a participant identifier for uniquely identifying each participant, and a participant timing data that includes the determined time of detection of the participant in proximity to the event detection point. The data interface is coupled to the processor and memory. The computer executable instructions causing the data interface to communicate over a data communication network using a stateless broadcast protocol for communicating a plurality of predefined multicast and unicast messages, each predefined message including at least a portion of the participant data.

In yet another aspect, a method and a nontransitory computer readable medium encoded with a set of executable instructions for enabling a data interface of a sports timing system for communication over a coupled data communication network to cause a computer for storing in a memory participant data including participant data that includes a participant identifier for uniquely identifying each participant and participant timing data and transmitting, via a data interface, datagram messages over a stateless packet data communication network, datagram messages including multicast and unicast messages including at least a portion of the participant data. The method can include the following steps, the order of which is not significant, as other orders are possible and each of which are still within the scope of the present disclosure:

a. providing a present time signal from a timing clock;

b. receiving at a second data interface participant detection data from a detection system responsive to the detection system detecting a proximity of a participant in a sporting event to a detection point;

c. determining in a processor the participant timing data responsive to the received participant detection data and the present time signal;

d. storing a plurality of the participant data in the memory including the determined the participant timing data;

e. wherein the detection system is an RFID tag reading system having one or more RFID tag readers and wherein the participant detection data includes an RFID tag number uniquely assigned to the detected participant, communicating with the RFID tag reading system and receiving the participant detection data including a RFID tag number of the detected participant's RFID tag;

f. transmitting the datagram messages using user datagram protocol (UDP);

g. storing an identification of the STS system, and formatting the multicast datagram messages to not include the stored STS identification in the multicast message but to include an identification of an intended receiving STS system, and formatting the unicast messages to include the stored STS identification and to include an identification of an intended receiving STS system;

h. formatting multicast messages are selected from the group of message consisting of: ANNC, ANNCL, READ, NOANNC, RESEND, TSYNC, RSIG, and KREFRESH; and wherein the unicast messages are selected from the group of messages consisting of: REANNC, RESEND, LOOKUP, STARTRFID, STOPRFID, COMMAND, RQIMAGE, STIMAGE, RQIDIR, STIDIR, RQIDTREAMON, and RQISTREAMOFF;

i. storing an identification of the STS system; formatting one or more broadcast message to not include the STS identification or any identification of an intended receiving STS system; and transmitting via the data interface the one or more broadcast messages;

j. formatting broadcast messages are selected from the group of messages consisting of: ANNCM and TRSTART;

k. formatting the participant identifier in the format selected from the group consisting of a bib number, and a participant identification number; and l. wherein one or more of the predefined message includes a uniquely assigned packet number that is a next sequential number for the data interface.

Of course other steps and processes are also possible as will be understood by one of skill in the art of timing systems.

Referring now to the drawings,

FIG. 1 is a schematic drawing showing the system architecture of the sports timing system (STS) integrated communication system (ICS), according to one exemplary embodiment.

As illustrated, and by way of example only, the system architecture includes four sports timing systems, $STS_A$-$STS_D$, and two sports timing auxiliary systems, $STAS_A$-$STAS_B$ and a distributed clock system, DC, which provides a present time signal to the sports timing systems, $STS_A$-$STS_D$. Each of the sports timing systems $STS_A$-$STS_D$ uses a corresponding integrated communication interface, $STS$-$ICS_A$-$STS$-$ICS_D$, to communicate with each other and with the sports timing auxiliary systems, $STAS_A$-$STAS_B$ over a communications network STS NET. Similarly, the sports timing auxiliary systems, $STAS_A$-$STAS_B$, use an integrated communication interface STS-ICS to communicate with each other and with the sports timing systems, $STS_A$-$STS_D$ over the communications network STS NET. Each of the sports timing systems, $STS_B$-$STS_D$, may be paired with a corresponding detection system $DS_{SL}$, $DS_{IP}$, $DS_{FL}$. The detection systems $DS_{SL}$, $DS_{IP}$, $DS_{FL}$ are configured to read a tag worn by an event participant and to communicate one or more read times, synchronized to the distributed clock system, DC, to the corresponding sports timing system $STS_A$-$STS_D$.

As shown, sports timing system, $STS_A$ is not paired with a detection system. Rather, sports timing system, $STS_A$ is equipped with a Graphical User Interface 10 and input system 20. Together, the Graphical User Interface 10 and input system 20 is configured to allow either manual entry by a human user or electronic entry from an outside system, and interacts with a database application for storing a plurality of participant data in the memory wherein each participant data including a participant identifier for uniquely identifying each participant, along with other participant data, without limitation, including contact information and group affiliation. Graphical User Interface 10 and input system 20 may be implemented in any suitable application programming environment, including but not limited to the Microsoft®.NET Framework.

The exemplary embodiment shown in FIG. 1 depicts two sports timing auxiliary systems, $STAS_A$-$STAS_B$. Sports timing auxiliary system, $STAS_A$ is equipped with a display 30. The display may include, but is not limited to a computer monitor, message board, time clock or any other display device. Sports timing auxiliary system, $STAS_A$ is configured with suitable computer executable instructions for using the integrated communication interface STS-ICS to communicate with other sports timing auxiliary systems, such as $STAS_B$, and one or more of the sports timing systems, $STS_A$-$STS_D$ over the communications network STS NET. In an exemplary embodiment, sports timing auxiliary system, $STAS_A$ may function as a remote controller, coordinating the communications between the other sports timing systems and sports timing auxiliary systems.

In the exemplary embodiment depicted in FIG. 1, sports timing system $STS_A$ may function as a participant check-in location, sports timing system $STS_B$ may be positioned near the starting line of the race, sports timing system $STS_C$ may be positioned at an intermediate point between the starting and finish lines, and sports timing system $STS_D$ may be positioned near the finish line of the race.

One skilled in the art will recognize that the system may be configured to include more or fewer sports timing systems and more or fewer sports timing auxiliary systems as the configuration of the race course or number of participants would dictate. Additionally, the exemplary embodiment of FIG. 1 as shown depicts a circular race course over which one or more laps may be run. One skilled in the art will recognize that any course configuration may be supported by providing an appropriate number of sports timing systems, STS's, and two sports timing auxiliary systems, STAS's, arranged in a manner suitable to cover the entire course.

During operation of the system, a participant P, wearing a tag suitable for detection by each of the detection systems $DS_{SL}$, $DS_{IP}$, $DS_{FL}$ would begin near sports timing system $STS_B$, travelling along the path $P_{B-C}$. As the participant nears $STS_B$, detection system $DS_{SL}$ will detect the participant's unique identifier or other participant data, record participant timing data, which constitutes part of the participant data, which includes the determined time of detection of the participant in proximity to a detection point at the location of detection system $DS_{SL}$ Sports timing system $STS_B$ may then use the integrated communication system STS-$ICS_B$ to communicate the participant data to one or more of the sports timing systems, $STS_A$, $STS_C$-$STS_D$, or sports timing auxiliary systems, $STAS_A$-$STAS_B$ over the communications network STS NET. As the participant continues along the path $P_{C-D}$ through path $P_{D-B}$, sports timing systems, $STS_C$, $STS_D$, and their corresponding detection systems $DS_{IP}$, $DS_{FL}$ would perform in a similar manner just described for sports timing system, $STS_B$ and its corresponding detection systems $DS_{SL}$. In this way, the collective system is able to track the progress and timing of the event participant as they traverse the race course covering paths $P_{B-C}$, $P_{C-D}$ through path $P_{D-B}$.

Figure 2:
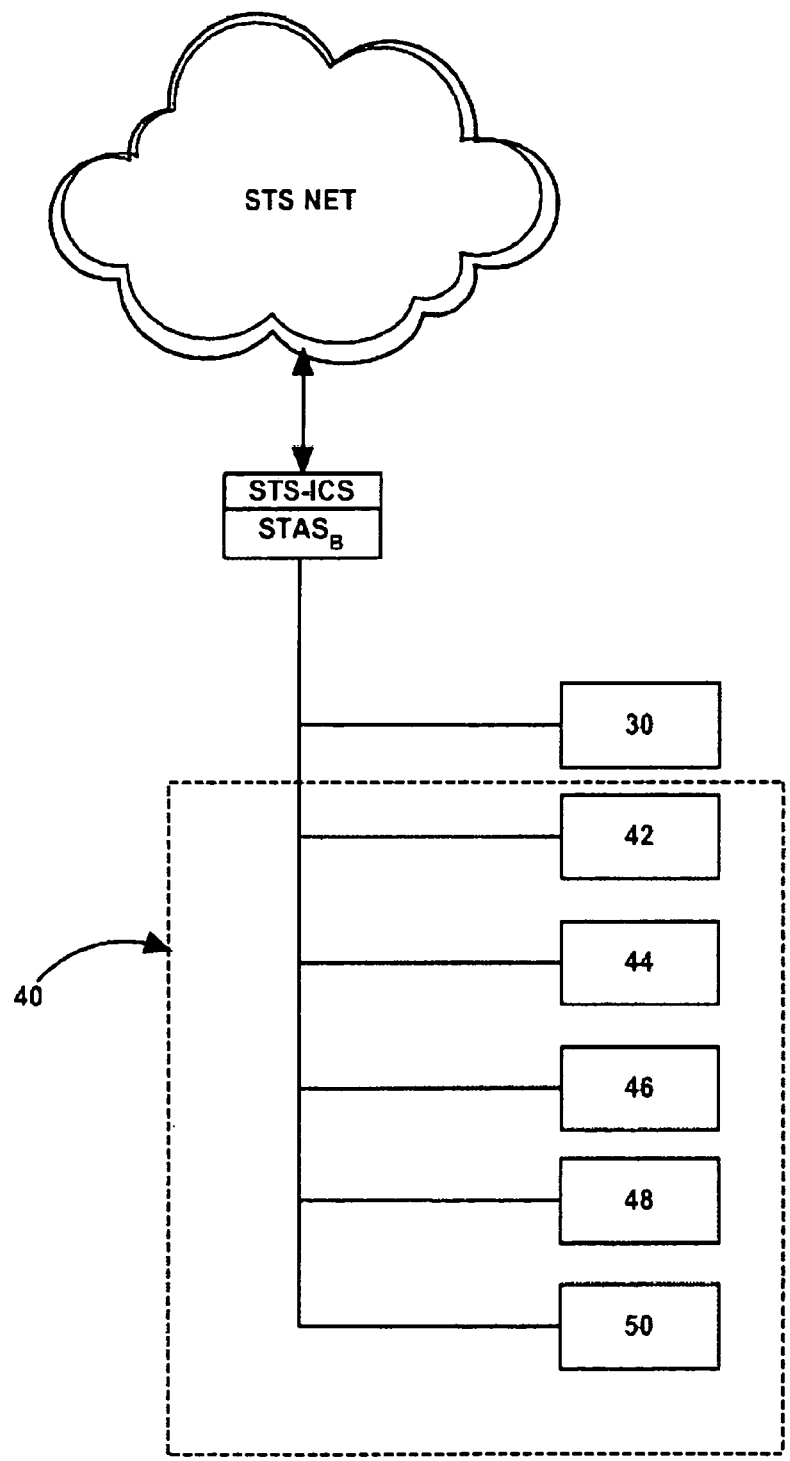
FIG. 2 is schematic drawing showing the interface between the STS-ICS and various external systems, according to one exemplary embodiment.

FIG. 2 is schematic drawing showing the interface between the STS-ICS and various external systems, according to one exemplary embodiment. Sports timing auxiliary system, $STAS_B$ utilizes the integrated communication system STS-ICS to receive participant data, including the participant's unique identifier or other associated data and participant timing data, from other sports timing systems and sports timing auxiliary systems connected to the STS NET. Sports timing auxiliary system, $STAS_B$, includes interface 40, which contains computer executable instructions for formatting the data received into an appropriate format as dictated by external systems 30, 42, 44, 46, 48 and 5, and transmitting the formatted participant data to external systems 30, 42, 44, 46, 48 and 50, using the corresponding formatter 30F, 42F, 44F, 46F, 48F and 50F. In an exemplary embodiment, external system 30 includes a display as described above in relation to sports timing auxiliary system, $STAS_A$. In an exemplary embodiment, external system 42 may represent an electronic mail system. E-mail formatter 42F may use the Simple Mail Transport Protocol (SMTP), or other suitable protocol to format electronic mail messages containing participant data to be sent by external system 42. External system 44 may represent a Short Message Service (SMS) system. SMS formatter 44F is configured to format messages containing participant data to be sent by external system 44. External system 46 may represent a particular web page interface. Web formatter 46F is configured to format messages containing participant data to be sent by external system 46, as dictated by a particular interface defined by the implementer of external system 46. Social Networking Formatter 48F is configured to format posts on social network sites 48, including without limitation Facebook® or MySpace®, in a format dictated by the implementers of social network sites 48. External system 50 can be any external system that utilizes the participant data received by sports timing auxiliary system $STAS_B$. API formatter 50F is configured to send and receive predefined messages to allow external system 50 to access participant data, including the participant's unique identifier or other associated data and participant timing data, received by sports timing auxiliary system $STAS_B$ over the integrated communication system STS-ICS.

The external systems, and the interfaces used to communicate with those external systems, just described are merely examples of the type of external systems that may be interfaced to the system architecture through a sports timing auxiliary system. One skilled in the art will appreciate that given an appropriate formatter, an interface to any external system could be implemented.

Figure 3:
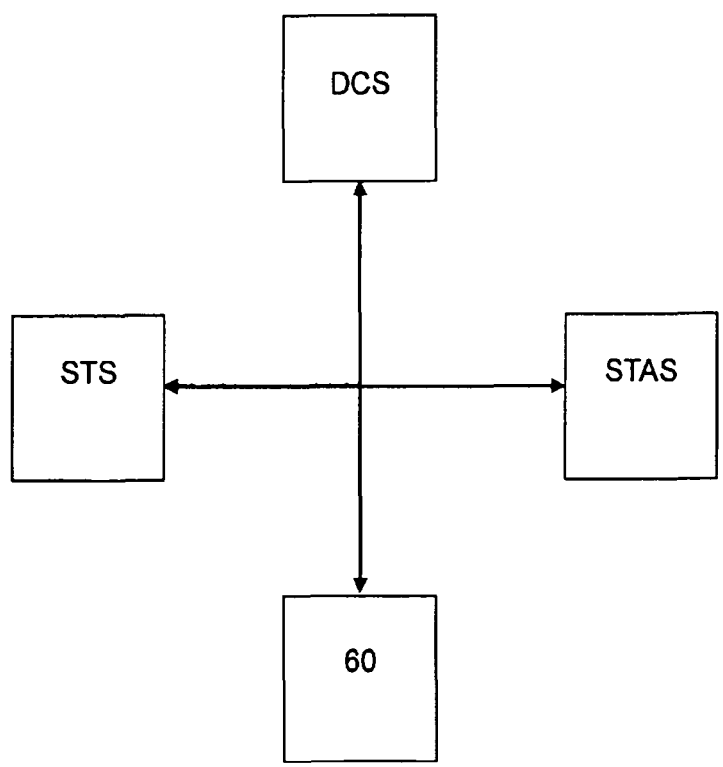
FIG. 3 is a schematic drawing showing an Example Communications Architecture configuration in which the Sports Timing Communications Systems and methods may be used to facilitate the exchange of information between different types of devices according to one exemplary embodiment.

FIG. 3 illustrates a schematic drawing of a typical communications architecture that could be used at a sporting event. The STS-ICS makes it possible for the devices shown to share race information. A system implementing the STS architecture consists of a Distributed Clock System DCS, one or more sports timing systems STS, one or more auxiliary timing systems, STAS and external devices 60. The external devices 60 include external devices 30, 42, 44, 46, 48 and 50 described above, and may include other external devices without limitation, such as cellular telephones or smart phones.

FIG. 4 illustrates a variable length message information packet structure that is used to communicate event data. This packet may contain any type of information and the format of the packet includes the following: message type, source, custom field(s), and end of message indicator. Several message types are already defined, as documented below. However, the message type may contain any text which uniquely identifies a message. The system receiving the message will use the message type to determine the action required. The next field in the packet includes the source. The source is a name or unique identifier that indicates which system transmitted the message. This information is used by the receiving system to know where to send a response. The source field can include any text, but typically the IP address of a computer or device is used. The next fields within the packet are customer fields that may contain any type of information. The flexibility of the protocol makes it possible to send any type of information from one system to another. The final field that should be included in each information packet contains EOM|. This is the end of message indicator which is used by the receiving system to know when all information within a packet has been received. The packet also uses the | character to delimit each field.

Referring now to FIG. 5, there is shown the pre-defined information messages provided within the protocol. The following describes each message:

(A) Announce Message (ANNC). This message can be sent from a participant detection system, generally referred herein as an RFID system, but not limited to only RFID systems, to one or more devices on the network and the message includes information on a participant whose participant tag was read. The information within the packet includes the bib number, name, age, gender, city, and packet number. The packet number is not required and the value could be set to 0. However, if sequencing of packets is desired, for the purposes of guaranteed delivery of information, the packet number could be sent to the receiving devices. Those devices could then analyze the sequence number to verify that all packets have been received. If a particular field within the packet is not needed, a single space can be used for that field. The packet could be expanded to include additional fields as necessary.

(B) Re-announce message (REANNC). This message can be sent from a receiving device to a transmitting device to indicate that a packet was not properly received. If packet numbers are being used for the purpose of verifying that all packets are received, the re-announce message can be used to request another transmission of a packet that never arrived at the receiving device. The packet could be expanded to include additional fields as necessary.

(C) No announce message (NOANNC). This message can be sent from a device to indicate that no messages are available for a given packet number. If a device issues a re-announce message to a transmitting system, the REANNC message will include the requested packet number. If that packet number in invalid or is no longer available for re-transmission, a NOANNC message can be transmitted back to the receiver. The packet could be expanded to include additional fields as necessary.

(D) Read message (READ). This message can be sent from a system that has just read a participant tag. The message could be sent to any other device(s) and the message includes the tag serial number just read. It also includes the time of the tag read as well as an optional packet number. The READ message is the primary information packet used to communicate tag read data to all devices. The packet could be expanded to include additional fields as necessary.

(E) Read message (READ). This message can be sent from a system that has just read a participant tag. The message could be sent to any other device(s) and the message includes name of the participant that corresponds with the tag serial number just read. It also includes the time of the tag read as well as an optional packet number. The READ message is the primary information packet used to communicate tag read data to all devices. The packet could be expanded to include additional fields as necessary.

(F) Re-send message (RESEND). This message can be sent from a receiving device to a transmitting device to request another send of a particular packet. If packet numbers are being used for the purpose of verifying that all packets are received, the re-send message can be used to request another transmission of a packet that never arrived at the receiving device. The packet could be expanded to include additional fields as necessary.

(G) Time Sync (TSYNC). This message can be sent to all devices on the network to indicate the current time at the transmitting device. This message is used to synchronize the time on all devices, which is crucial for RFID systems that are used for timing sporting events.

(H) Look up (LOOKUP). This message allows a device to request race information from another device. The identifier may be any text. In most cases, the identifier will be a tag serial number, race bib number, participant name, or perhaps a unique identifier that refers to a particular type of information. For example, if a device needs to know the current duration of a race, the LOOKUP message could be sent to a time system that is tracking the total race time. The identifier field might contain the text entry "RACETIME" and this entry could be used to indicate that the race duration is desired. The packet number field is optional and if not used, the field could contain a single space.

(I) Start RFID. This message could be sent to a device to indicate that it should start performing a specific tag reader or participant detection function. If the function is to begin at a certain date or time, the TIME field could contain that information. This field could be used to initialize and start a remote participant detection system so that it begins to read tags.

(J) Stop RFID. This message could be sent to a device to indicate that it should stop performing specific participant detection or tag read function. If the function is to stop at a certain date or time, the TIME field could contain that information. This field could be used to stop a remote tag reader or participant detection system so that it no longer reads tags.

(K) Command. This message could be sent to a device to request that a particular command be executed. The IDENTIFIER field may contain any text desired. This field could be used to send any tag reader or participant detection system command to a remote device. For example, if the current battery charge level on a remote system needed to determined, a Command message could be sent with the text BATTERYSTATS in the IDENTIFIER field. The remote system would need to have functions built in that can process the command.

The STS-ICS facilitates and streamlines the communication of tag reader or participant detection system timing information between multiple computers used at sporting events. The protocol is flexible and adaptable and can be used to transmit any type of information across any type of network. The use of variable length messages makes it possible to customize the messages sent or received from any type of device. The protocol is simple and efficient and can be quickly implemented.

The foregoing descriptions of specific embodiments of the present design have been presented for the purposes of illustration and description. They are not intended to be fully exhaustive or to limit the design to the precise use, form, or methods disclosed, and it is obvious that many modifications or variations are possible in the light of the information provided above. The embodiments were chosen, shown, and described in order to best explain the concepts and principles and the practical application of the design, thus providing others skilled in the art the ability to best utilize the design and various embodiments with various modifications as are suited to the particular use desired.

Some of the advantages of the STS-ICS include facilitating and streamlining the communication of tag reader or participant detection system timing information (such as RFID systems by way of example) between computing systems of similar or non-similar nature. For example, the protocol would permit the communication of sports timing information between desktop computers and cellular phones.

STS-ICS

The Sports Timing System (STS) Interactive Communication System and Method (STS-ICS) as described herein has both text files and network interface files.

STS-ICS can have text files that a user or STS system developer can access for creating STS-ICS compatible systems or applications.

In addition, a network interface provides an ability to communicate with STS in real-time. The file interface is very quick and easy to use. The network interface is much more complex and can require experience in writing network applications. In addition, as describer herein one skilled in the art of this STS-ICS network interface and method requires an understanding of any operating systems environments in which the present STS-ICS system and method are implemented. As such, it is assumed that any person of skill in the art implementing the present STS-ICS system and method is well versed in such implementing operation system environment.

STS Files

STS-ICS can have multiple files that are used within the STS system, but the two files that are needed to access are the Chip Output File and Database File. The file formats documented below are subject to change, so please check with us periodically for updates.

STS Output File

An STS system with a coupled participant detection system monitors a detection point and collects the identification of the detected participant and stamps a time of detection for each participant. These are referred by way of example herein as collecting participant and detection data including detection times, which can be written as participant read information to a text file. As described by way of example herein. a "chip" is a timing chip that is associated with a participant in the sporting event. A chip refers to the detection of at particular participant by a particular detection system. While a chip refers generally to an RFID chip and the reader is an RFID reader, those skilled in the art would understand that the reference to an RFID chip or chip, could be any type of tag reader or participant detection at a detection point and still be within the scope of the present disclosure.

An STS system or a user of such STS system can predetermine the name and location for the file. This file is updated in real-time by the STS system as the race progresses and it contains the following information: Antenna#,Bib#,Bib#, "Time" The file always uses a delimited format, shown here by example using commas as the delimiters, and the time field can be any format, but is shown in this example as having quote marks.

The exemplary format is readable by a spreadsheet or many third party programs, but other formats are also possible. An STS system can ignore the Antenna # field for many applications as the Antenna# field is often used internally by an STS for uniquely identifying the actual equipment making the detection. The Bib # field appears twice and this is not an accident. This is repeated in this exemplary embodiment as several third-party programs require this format when importing a race timing data file. The final entry is the time of the chip read which is in the format of "HH:MM:SS" or "HH:MM:SS.XXX." As shown in this later example, the format for chip read times can be expanded to include sub-second timing. STS-ICS communication systems and methods should properly handle time values that may include tenths, hundreds, or thousandths of a second.

In the STS system, the chip number is generally the same as the bib number worn by the participant. Thus, for a race with perhaps 500 participants, the Bib # field may contain a value from 1 to 500. For larger racing events, the Bib # field can be up to 99999 or even up to 500000 or so depending on the requirements as the STS and STS-ICS systems will support these expanded field lengths.

The following is a sample of a typical STS-ICS output file using the HH:MM:SS format:

0,41,41,"14:27:42"
0,47,47,"14:27:44"
0,39,39,"14:27:46"
0,14,14,"14:27:48"
0,32,32,"14:27:50"

Each STS is capable of detecting and reading a single chip or participant multiple times as it approaches a timing detection point. Thus, an output file may contain multiple entries for the same chip/participant. The last entry is the final read on a chip. For example, the following output file shows that a single chip was read multiple times as the runner approached the finish line in a race.

0,32,32,"14:28:20"
0,32,32,"14:28:21"
0,32,32,"14:28:22"

In one exemplary embodiment, the output file only contains one entry since most runners can pass through the timing point in one second or less. However, if a race can have a number of walkers, there may easily be 4 to 5 entries for the same timing chip as the walker approaches and goes past the finish line.

As STS reads timing chips, the STS system appends new data to the file and continues to do so during the race. Thus, the file should not be modified or locked while a race or event is ongoing. It's best to read the file once the race is concluded, or while the system is not actively reading timing chips.

STS Database File

Each STS system coupled with a participant detection system (PDS) can have a high-speed memory with a binary database that runs in the memory and is updated very rapidly when the chips are being read. When this database is saved to the disk drive, it is written to a text file using a delimited format, such as delimited using commas. When using commas as the delimiters, the file can be read by third-party programs without having to build a complex database interface as such files are common as known to those skilled in the art.

The following is a sample database file record:
1,Jay_Cooper,
08:00:00,08:15:00,00:00:00,00:00:00,00:00:00,08:4
5:00,00:45:00,50,Half Marathon,M,Allentown,Team Cooper,50001,Club Member,#76435,137

STS can have the ability to automatically write out the database during a race to a file name selected by the STS user. For example, the STS can be specified to have a file written to the disk every 30, 45, or perhaps 60 seconds. In addition to writing the file to the disk, STS can automatically create multiple files that have a unique file name that is based on the current date and time. By having multiple files on the disk, any of the files can be accessed without a concern about STS accessing those files again once they have been created. For example, an STS system can write the database to the disk every 60 seconds with a unique file name. The STS system can specify the base file name as STSDB.txt. When STS writes the file, it creates a file with the following name format:
STSDB20090501100502.txt There can be multiple files on the disk drive, and there could be hundreds of files by the time the race completes. Each of these files is essentially a unique snapshot of the race results for that moment in time.

The following is the format for the database file:
Bib#,Name,StartTime,Split1,Split2,Split3,Split4,FinishTime,Elaps edTime,Age,Division,Gender,City,TeamName, ChipField,UserField1,UserField2,UniqueID The Bib # field can contain a value from 1 to 99999 depending on the version of the STS system in use.

The Name can contain the full name and is typically formatted as FIRST NAME LAST NAME with no comma between the first and last name, but may be formatted such as using an underscore or the like. In some embodiments, it is undesirable for particular characters, such as a comma, by way of example, not be included in the name field due to their use as a delimiter where applicable. When an STS system loads the database file, it can use particular characters such as a comma to determine the individual fields. Thus, such STS database delineation characters should not be used in the Name field as such usage can cause STS to use the wrong fields for the remaining entries on the line being read.

The following fields all contain a time based on the time of day:
Start Time, Split1, Split2, Split3, Split4, Finish Time. All of these fields are in the format HH:MM:SS or HH:MM:SS.XXX and there are no quote marks.

The described format for chip read times can be expanded to include sub-second timing. Any STS-ICS implementations should be implemented to properly handle time values that may include tenths, hundreds, or thousandths of a second. Following is one exemplary embodiment of a set of applicable STS data fields:

a) The Elapsed Time field is a calculated field which is typically the Finish Time minus the Start Time. This field is in the format HH:MM:SS or HH:MM:SS.XXX and there are no quote marks.

b) The Age field can contain up to 3 digits typically ranging from 1 to 100.

c) The Division field can contain a text entry that can be up to 250 characters in length, although it is typically 20 or less characters long.

d) The Gender field can contain a text entry that can be up to 250 characters in length, although it is typically 1 character with either an M or F entry.

e) The City field can contain a text entry that can be up to 250 characters in length, although it is typically 25 or less characters long.

f) The Team Name field can contain a text entry that can be up to 250 characters in length, although it is typically 25 or less characters long.

g) The Chip field can be used, in some embodiments, to include a text entry that is associated with a particular timing chip. In some embodiments the Chip field can be up to 250 characters in length, although it is expected to be 6 or less characters long.

h) The UserField1 field can contain a text entry that can be up to 250 characters in length, although it is typically 25 or less characters long. This field may be used by the software to contain values related to team order for relay races. In some cases, the STS user can place information in this field related to the STS user's personal information such as emergency contact number.

i) The UserField2 field can contain a text entry that can be up to 250 characters in length, although it is typically 25 or less characters long. This is a second field that often contains additional personal information about a race participant.

j) The UniqueID field can contain a text entry that can be up to 250 characters in length, although it is typically 10 or less characters long. This field is often used to track race-day registration numbers or other unique values that identify a race participant. STS can automatically insert a unique value in this field during the rapid registration process in the software.

Not only can STS write this text file to the disk drive, it can read it back in from the database. Thus, a database file can be created using this format and STS can read it just fine. Any time fields that are created should be in the HH:MM:SS or HH:MM:SS.XXX format with leading zeros on any times that are less than 10. For example, if the time is 9:10 am, the field should contain the entry 09:10:00 or 09:10:00:000. In most cases, when creating a new file that can be loaded into STS, the time fields should contain 00:00:00 or 00:00:00:000. However, if a race has assigned start times, the start times can be loaded into STS by using the StartTime field.

STS-ICS Network Interface

STS can have a state-less network interface such as provided by a user data protocol (UDP) system as used for outbound and inbound messaging over a suitable communication network. The STS-ICS system utilizes these messages to include outbound packets using STS-ICS for READ and ANNOUNCE information, as well as other data as described herein. In addition, an STS using STS-ICS monitors the Internet connection for UDP STS-ICS messages from other STS-ICS systems or third-party programs coupled to the same communication network. This interface allows third-party programs to be developed which can work within the STS architecture.

UDP packets as used by the present STS-ICS system provide a very quick and relatively easy system to implement and from which to build flexible and robust applications. While there are known limitations for UDP packets, the describes application of the UDP packets in the STS-ICS recognizes these limitations and adjusts the design and applications accordingly whereby UDP provides a very suitable solution for communicating between multiple STS systems as well as sport timing auxiliary systems (STAS) in which auxiliary applications can provide vertical applications utilizing the information available within the STS-ICS system and methods.

The following includes the packet structure for all STS-ICS supported UDP packets. STS-ICS can be configured to listen and send on any socket ranging from 5000 to 9999. In addition, STS-ICS can be set to send to a specific computer by using either the computer name or its IP address. Furthermore, STS-ICS can send to all computers on the network by using 0.255 as the last bytes in the IP address. Of course in other systems and embodiments other broadcast messaging address can also be used and still be within the scope of the present invention. In this example, if the STS-ICS is set to 192.168.1.255, the STS-ICS sends messages as Broadcast packets. STS-ICS message are sent as clear text contained within the UDP packet, with fields separated by the "|" characters. |EOM| should always come at the end of each message.

As noted, the STS-ICS network interface is configured for stateless broadcast communications systems, such as UDP using a broadcasting IP address indicator such as 255. The networking interface can however support a variety of different types of messages. These can include broadcast messages, multicast messages and unicast messages, between and among various STS-ICS systems.

Broadcast STS-ICS messages are transmitted from the STS-ICS interface over the stateless broadcast communication network with no addressing as to the intended recipient as well as no identification the STS-ICS system that is sending or sent the message. As such, each of the Broadcast STS-ICS Messages can be read by any listening STS-ICS device, and once received by that device, the receiving STS system does not know which other STS system sent the message. As will be discussed, these include, by way of example, the ANNCM and TRSTART messages.

Multicast STS-ICS messages are transmitted from the STS-ICS interface over the stateless broadcast communication network with no addressing as to the intended recipient. However, these messages include an identification of the sending STS system, e.g., FROM identifier. These STS-ICS multicast messages can be read by any STS-ICS system and once received by that STS system, the receiving STS system knows which of the other communicating STS systems the message originated. These include, by way of example, the ANNC, ANNCL, READ, NOANNC, RESEND, TSYNC, RSIG, and KREFRESH messages.

Unicast STS-ICS messages are transmitted from the STS-ICS interface over the stateless broadcast communication network with an identification of which the sending entity is (FROM identifier) as well as an identification of the intended receiving STS system (DEST or Destination identifier). These unicast STS-ICS messages are essentially point to point messaging within a stateless broadcast messaging communication system. Only the identified destination STS-ICS system should receive these messages and they are ignored by all other listening STS system. The receiving STS system knows that the message was intended for its use and it knows the identification of the sending STS. These include, by way of example, the REANNC, RESEND, LOOKUP, STARTRFID, STOPRFID, COMMAND, RQIMAGE, STIMAGE, RQIDIR, STIDIR, RQIDTREAMON, and RQISTREAMOFF messages by way of example.

It should be understood to those skilled in the art that other broadcast, multicast and/or unicast messages can also be developed as an application may require or benefit from the present disclosure, and still be considered within the scope of the present disclosure.

Announce Message (ANNC):

The ANNC packet is sent by STS-ICS to the network and can be captured by any device that is listening on the network for UDP packets. The message indicates that STS can have read a chip at the location indicated in the From field.

Packet length=variable size

Total fields=10

ANNC|FROM|BIB#|NAME|AGE|GENDER|CITY|TIME|PACKE T#|EOM|

The information in this STS-ICS packet comes from the STS internal database. The packet # is a unique 3 digit value that begins with 1 and continues to 999, after which it wraps around and starts over at 1. This packet # can be used to ensure that all messages are received. If a message is missing, a request can be made to resent that packet. STS-ICS maintains a circular buffer of past messages for this purpose.

Announce Message for Lap Races (ANNCL):

The ANNCL packet is sent by STS-ICS to the network and can be captured by any device that is listening on the network for UDP packets. The message indicates that STS can have read a chip at the location indicated in the From field.

Packet length=variable size

Total fields=11

ANNCL|FROM|BIB#|NAME|AGE|GENDER|CITY| TOTAL LAPS|TIME|TEAM NAME|PACKET#|EOM|

The information in this STS-ICS packet comes from the STS internal database. The packet # is a unique 3 digit value that begins with 1 and continues to 999, after which it wraps around and starts over at 1. This packet # can be used to ensure that all messages are received. If a message is missing, a resend of the packet can be requested. STS-ICS maintains a circular buffer of past messages for this purpose.

Re-Announce Message (REANNC):

The REANNC packet can be sent by STS-ICS to request a re-send of a particular packet.

Packet length=variable size
Total fields=5
REANNC|FROM|DEST|PACKET#|EOM|

When this STS-ICS message is used, the packet number should be included as desired from the STS or STS-ICS buffer. The FROM and DEST fields contain the IP addresses for the two systems.

No Announce Information (NOANNC):

The NOANNC packet is sent via the STS-ICS when a request was made for a packet that is not yet available. For example, if STS-ICS can only send 100 packets, and a system requests packet number 120, the system will generate the NOANNC message in response.

Packet length=variable size
Total fields=10
NOANNC|FROM|0| |0|M| |00:00:00|Packet #|EOM|

The message returns the requested packet number with the NOANNC header.

Announce Message Information (ANNCM):

The ANNCM packet is sent by STS-ICS or the Kiosk when a new message is received by an input such as is entered by a participant or family member requesting a specific participant's data be displayed on a Kiosk or an Announcer screen.

Packet length=variable size
Total fields=4
ANNCM|BIB #|MESSAGE|EOM|

Read Message (READ):

The READ packet is sent by STS-ICS to the network and can be captured by any device that is listening on the network for UDP packets. The packet is a real-time feed of any reads that are occurring at the particular STS timing system.

Packet length=variable size
Total fields=6
READ|FROM|BIB#|TIME|PACKET #|EOM|

Packet number is a value that begins with 1 and goes to 999. Once it reaches 999, it starts over again at 1. This packet number is used to reference past messages in case a message is lost on the network and a re-send is requested.

Additionally a separate READ message can be used that includes the PARTICIPANTNAME field in lieu of the BIB#.

Resend Message (RESEND):

The RESEND message is sent to any STS system requesting that it re-send a past message. If a message is lost over the network, a request to resend can be made for any of the last 999 messages sent previously. STS-ICS maintains a buffer with the past 999 messages. Once the 999 position is used, STS-ICS starts over at position 1. Thus, STS-ICS is maintaining a circular buffer of messages.

Packet length=variable size
Total fields=5
RESEND|FROM|DEST|PACKET #|EOM|

The Destination field is the STS system that should respond to this request. This is the same name set in the STS Defaults for "My Name" in the networking section. If a request is made for a packet number that has not yet been used by STS-ICS, a packet response starting with the BLANK field can be received.

Time Sync Message (TSYNC):

The TSYNC message is sent using STS-ICS to any STS system that is listening for Time Sync commands. This is typically used by STS Remote to make sure the time on the Remote laptop is the same as that on the STS system. There can always be a slight delay in the network transmission, and as such a 0.25 to 0.5 second delay may be added to the time received using STS-ICS to compensate for the delay.

Packet length=variable size
Total fields=4
TSYNC|FROM|TIME|EOM|

The FROM field is the name set in the STS Defaults as My Name.

Time Start Message (TRSTART):

The TRSTART message is sent using STS-ICS to the Kiosk to set the start clock for the event. The start time can be set on a Kiosk using a command in the Configuration screen. However, by sending this packet to the Kiosk, the time can be set remotely from a STS system.

Packet length=variable size
Total fields=3
TRSTART|TIME|EOM|

Remote Signal Message (RSIG):

The RSIG message is sent using STS-ICS to any system that is listening for RSIG command. This is typically used by STS Remote to make sure the connection over the network is good to STS-ICS and also to verify that STS-ICS is scanning and listening for remote entries.

Packet length=variable size
Total fields=4
RSIG|FROM|TIME|EOM|

The FROM field is the name set in the STS Defaults as My Name.

Refresh KIOSK Message (KREFRESH):

The KREFRESH message is sent using STS-ICS to any system (typically a Kiosk) that is listening for the KREFRESH command. This is typically used by STS-ICS to send out all of the results in a race to the Kiosk. This might be useful if the Kiosk re-booted or if the Kiosk was started after results had already occurred in a race Packet length=variable size
Total fields=10
KREFRESH|FROM|BIB#|NAME|AGE|GENDER|CITY|TIME|PA CKET#|EOM|

The information in this STS-ICS packet comes from the STS internal database. The packet # is a unique 3 digit value that begins with 1 and continues to 999, after which it wraps around and starts over at 1. This packet # can be used to ensure that all messages are received. If a message is missing, a request that packet can be re-sent can be made. STS-ICS maintains a circular buffer of past messages for this purpose.

Lookup Message (LOOKUP):

The LOOKUP message allows a device to request race information from another device. The identifier may be any text. In most cases, the identifier will be a tag serial number, race bib number, participant name, or perhaps a unique identifier that refers to a particular type of information. For example, if a STS systems needs to know the current duration of a race, the LOOKUP message could be sent to a STS system that is responsible for tracking the total race time. The identifier field might contain the text entry "RACETIME" and this entry could be used to indicate that the race duration is desired. The packet number field is optional and if not used, the field could contain a single space.

Packet length=variable size
Total fields=6
LOOKUP|FROM|DEST|IDENTIFIER|PACKET #|EOM|

Start RFID Message (StartRFID):

The StartRFID message can be sent to a STS system to indicate that it should start performing a specific RFID function. If the function is to begin at a certain date or time, the TIME field could contain that information. This field could be used to initialize and start a remote RFID system so that it begins to read tags. As also, as used here this is specific to RFID readers. It should be understood to those skilled in the art, that other reader or detection systems are possible and in such embodiments, other messages can be developed or this message can be adapted for their use. Other systems could include: laser detection, video detection, etc. As such, this message could alternatively be: StartDETECTOR, or StartLASER, or StartVIDEO. by ways of examples.

Packet length=variable size
Total fields=7
StartRFID|FROM|DEST|FUNCTION|TIME|PACKET #|EOM|

Of course those skilled in the art will understand that when other technology is used for the tag reader or participant detection system, this message can be renamed and still be within the scope of the present disclosure.

Stop RFID Message (StopRFID):

The StopRFID message can be sent to a device to indicate that it should start performing a specific RFID function. If the function is to begin at a certain date or time, the TIME field could contain that information. This field could be used to initialize and start a remote RFID system so that it begins to read tags. Other systems could include: laser detection, video detection, etc. As such, this message could alternatively be: StopDETECTOR, or StopLASER, or StopVIDEO. by ways of examples.

Packet length=variable size
Total fields=7
StopRFID|FROM|DEST|FUNCTION|TIME|PACKET #|EOM|

Of course those skilled in the art will understand that when other technology is used for the tag reader or participant detection system, this message can be renamed and still be within the scope of the present disclosure.

Command Message (COMMAND):

The COMMAND message can be sent to a STS system to request that a particular command be executed in that STS system. The IDENTIFIER field may contain any text desired. This field could be used to send any tag reader or participant or tag detector command to a remote device. For example, if the current battery charge level on a remote system needed to determined, a Command message could be sent with the text BATTERYSTATS in the IDENTIFIER field. The remote system would need to have functions built in that can process the command.

Packet length=variable size
Total fields=6
COMMAND|FROM|DEST|IDENTIFIER|PACKET #|EOM|

Request Image Message (RQIMAGE):

The RQIMAGE message is sent to a device to request that a particular image be returned. The message is useful when interfacing with a system that contains photographs or other pictures such as logos or artwork. The IDENTIFIER field should contain a unique descriptor for the image desired and may contain any text desired. Typically, this field will contain a unique number for a participant in an event. However, the IDENTIFIER could also contain a specific location on a remote system where a file is located. The COMPRESSION field may be used to specify the format of the image to be sent. If higher performance across a network is desired, this field might be used to indicate that High compression is desired. The field may contain any text that is recognized by the system designated as DEST. The PACKETSIZE field should contain a value indicating the maximum packet size to send at one time. Given that most images will contain more data than is able to be sent in a single packet, this field may be used to control packet size, thus tuning the network performance. The PSOCKET field is used when it necessary or desired to have multiple packet streams being sent simultaneously from the DEST. For example, the field could contain 7000 on one packet and 7001 on a different packet to indicate that two streams are being used simultaneously.

Packet length=variable size
Total fields=9
RQIMAGE|FROM|DEST|IDENTIFIER|COMPRESSION|PACKE TSIZE|PSOCKET|PACKET #|EOM|

Image Sent Message (STIMAGE):

The STIMAGE message is sent from a system responding to a request for an image, e.g., RQIMAGE. The IDENTIFIER field should contain the unique descriptor for the image that was requested and may contain any text desired. Typically, this field will contain a unique number for a participant in an event. However, the IDENTIFIER could also contain a specific location on a given system where a file is located. The COMPRESSION field indicates the type of compression used on the image when it was sent. If higher performance across a network is desired, this field might be used to indicate that High compression is desired. The PACKETSIZE field should contain a value indicating the length of the portion of the image just sent. Given that most images will contain more data than is able to be sent in a single packet, this field will be used to indicate how many bytes have been sent. The PSOCKET field contains a value indicating which stream the information is being sent on. This may be used when it necessary or desired to have multiple packet streams being sent simultaneously from a system. For example, this field could be used to send individual photos to different computers on a network at the same time.

Packet length=variable size
Total fields=9
STIMAGE|FROM|DEST|IDENTIFIER|COMPRESSION|PACKE TSIZE|PSOCKET|PACKET #|EOM|

Request Image Library Contents Message (RQIDIR):

The RQIDIR message could be sent to a device to request that the names of all images available be provided for that system. The message is useful when interfacing with a system that contains photographs or other pictures such as logos or artwork. The IDENTIFIER field should contain a unique descriptor for the type of images desired or a filter mask for the names or locations of images. For example, the IDENTIFIER might contain the text entry *, or it might contain a qualifier such as *.JPG is the user only wants to receive a list of images that are in JPG format. Of course other qualifiers may be used for other formats.

Packet length=variable size
Total fields=6
RQIDIR|FROM|DEST|IDENTIFIER|PACKET #|EOM|

Image Library Sent Message (STIDIR):

The STIDIR message can be sent to one or more systems as a response to an RQIDIR message and it includes a list of images available. The FILELIST field will contain a list of images in text format that are available. Each image name will contain a carriage return line feed indicator at the end of the name. If the list has been completely transmitted, a final indicator at the end of the list will include an entry of EOL followed by a carriage return line feed. This indicator means there are no additional packets being sent and the entire list has been provided.

Packet length=variable size
Total fields=6
STIDIR|FROM|DEST|FILELIST|PACKET #|EOM|
Request Image Message (RQISTREAMON):

The RQIDTREAMON message is by a STS system to request that a particular image stream be enabled for a real-time video feed. The message is useful when interfacing with a system that contains a camera displaying live video. The IDENTIFIER field should contain a unique descriptor for the image stream desired and may contain any text desired. Typically, this field will contain a unique name for a camera or video interface. However, the IDENTIFIER could also contain a specific socket, URL, or other indicator that is a live video stream. The COMPRESSION field may be used to specify the format to be used when sending the video stream. If higher performance across a network is desired, this field might be used to indicate that High compression is desired. The field may contain any text that is recognized by the system designated as DEST. The PACKETSIZE field should contain a value indicating the maximum packet size to send at one time. Since the video stream will contain a great amount of information, the image stream can be deconstructed into small packets that are sent across the network. The PSOCKET field is used when it necessary or desired to have multiple packet streams being sent simultaneously from the DEST. For example, the field could contain 6000 on one packet and 6001 on a different packet to indicate that two streams are being used simultaneously. The TIMEOUT field can be used to indicate how long, in seconds, the stream should be kept alive. If this value is set to 0, the DEST will continue to send the stream until a RQISTREAMOFF message is received.

Packet length=variable size
Total fields=10
RQISTREAMON|FROM|DEST|IDENTIFIER|COMPRESSION|PACKETSIZE|PSOCKET|TIMEOUT|PACKET #|EOM|
Request Image Message (RQISTREAMOFF):

The RQISTREAMOFF message is sent by a STS system to request that a particular image stream be disabled. The IDENTIFIER field should contain a unique descriptor for the stream to be disabled. The PSOCKET field can also be used to identify a particular socket, in the event that multiple streams are being sent at the same time.

Packet length=variable size
Total fields=7
RQISTREAMOFF|FROM|DEST|IDENTIFIER|PSOCKET|PACK ET #|EOM|

In other embodiments, the packet formats can vary from that described above and herein and still be within the scope of the present disclosure. For example, some or all of the timing system database fields can be sent when most of the packets are sent. In such embodiments, this can allow applications to have all of the data contained in a record in the database.

STS-IC Network Interface Design Guidelines

The following can provide additional insight about how to use the STS-ICS Networking Interface.

a) UDP packets are not guaranteed to be delivered on a network, as is the case with TCP. In some networks, routers can not automatically send UDP packets unless they are configured to do so. For the STS-ICS communication system as described herein, the router should be able to send UDP packets, as well as a broadcast datagram.

b) In some embodiments of the STS-ICS communication system, an STS system can only process inbound messages while it is connected to the timing system and the STS-ICS software is Enabled and Scanning. In such embodiments, if packets of information are sent to the STS-ICS, such sent packets will be discarded unless in the Scanning mode.

c) In some embodiments, an STS-ICS system can send and receive messages only if configured to do so in the software defaults. As such, the defaults should be set properly and enabling system/software may need to be rebooted after making any changes to ensure that the networking functions have started properly.

d) When STS-ICS sends Announce packets, it can actually send the first packet, wait about 10 milliseconds, and send a second identical packet. This architecture greatly increases the odds that a packet can reach the destination IP address. A filter can be created within an STS-ICS application that can identify and discard redundant packets.

e) There are no error messages sent using STS-ICS if packets are transmitted with an improper format. The malformed packet is discarded.

f) While STS is scanning for chip reads, it can check the network packet buffer approximately every 1 to 3 seconds for new messages that have been received. STS-ICS uses an automatic load balancing system for packet processing. If STS determines that the chip read load is lighter than normal, it can speed up the processing of inbound messages using an STS-ICS application. Thus, it is possible that STS could process as many as 20 messages every second. Thus, it is best to never send more than 20 messages per second to a STS-ICS system.

g) When STS-ICS is sending out messages, it can not process inbound messages until the send can have completed.

h) The volume of messages coming via STS-ICS can be quite large during a major race, so it's crucial that any code be able to quickly process these messages. Depending on the type of race or event being monitored by the STS system, as many as 300 messages per second is possible.

i) All STS applications, including STS-ICS, use one socket for outbound packets, and a different socket for inbound messages. Thus, any STS-ICS application should use the sockets designated in the STS-ICS specification be connected by the STS-ICS communication system and method as described herein.

STS-ICS Interfacing Application Example

The following is pseudo code for creating a STS-ICS UDP client application. This is simply an example of the type of STS-ICS communication code that can be implemented using the STS-ICS system and method as described herein.

```
int main( )
{
 int socketnum;
 struct socketnumaddress_in server_address;
 struct hostloc *host;
 char packet_data[128];
 host = (struct hostloc *) gethostbyname((char *)"192.168.1.255");
 server_address.sin_family = AF_INET;
 server_address.sin_port = htons(6002);
 server_address.sin_addr = *((struct in_addr *)host->h_addr);
 bzero(&(server_address.sin_zero),8);
 while (True)
 {
 printf("Type EXIT when done.");
 gets(packet_data);
 if ((strcmp(packet_data , "EXIT") == 0))
 {
 printf("Program done.");
```

```
    exit;
  }
  sendto(socketnum, packet_data, strlen(packet_data), 0,(struct
socketnumaddress*)&server_addr,
    sizeof(struct socketnumaddress));
  }
}
```

Troubleshooting STS-ICS Interface

When a implementation problem in a STS-ICS system or method is encountered, the inventor suggest the following be reviewed:

a) Make sure that any network interface is working properly.

b) Verify that any implementing STS-ICS application has permission to send and receive network packets.

c) Determine if the implemented router allows UDP packets to be sent through it.

d) Make sure that any sockets contain the proper values for interfacing using STS-ICS.

e) Utilize a network protocol analyzer that is designed to be used with the STS-ICS system and method to confirm that STS-ICS packets are being sent.

f) Be sure to include calls to the operating system that allow it to process application events.

g) Check any implementing STS-ICS system and method software code to verify that inbound packets are being requested in a timely manner.

h) Make sure to design and STS application using the STS-ICS system and method as described herein to eliminate redundant packets received.

i) Make sure the STS-ICS system is not listening for packets with multiple applications on the same computer using the same socket value.

j) Always check to make sure all bytes in the packet were transmitted correctly.

k) Verify that another program on any computer isn't already using the designated socket values.

l) Make sure the Firewall can allow the sending and receiving of UDP packets.

m) Verify that any receive buffers are large enough to handle all inbound messages.

Figure 6:
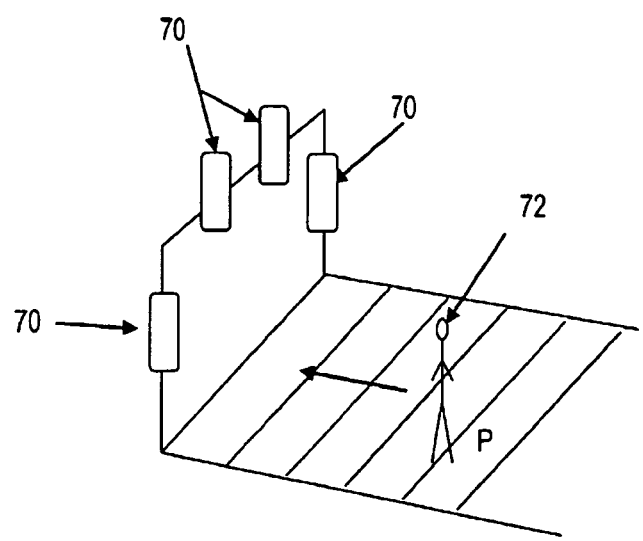
FIG. 6 is a schematic illustration of a typical STS system configuration that is used to read a Race Bib Tag as it passes antennas that are mounted overhead and on the side of a race course. The specific location of the antennas could be changed to include any position which is deemed suitable for receiving the Bib Tag signal from the tag according to one exemplary embodiment.

Referring to FIG. 6, there is shown a schematic of an exemplary RFID timing system being used for a sporting event. In this figure, there are RFID antennas 70 mounted both overhead and to the side of the race course that will communicate with the Enhanced RFID Race Bib Tag 72 as it passes through the structure on the body of the participant P. This system configuration is commonly referred to as a "timing point," and its purpose is to read RFID tags and to record the time the participant passes.

Figure 7:
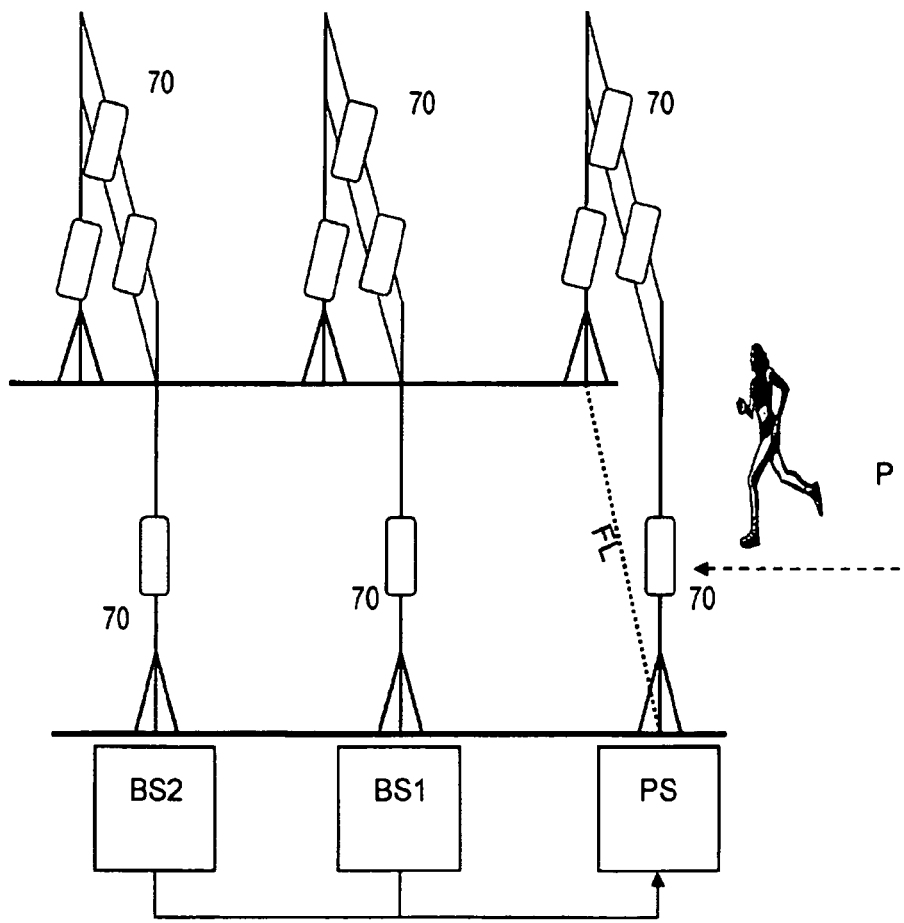
FIG. 7 is a schematic drawing showing a redundant STS Detection System network configuration according to one exemplary embodiment.

Referring now to FIG. 7, there is shown the schematic drawing of the design of a timing point, in this case a finish line FL incorporating two backup timing systems BS1, BS2 which are networked into the primary system PS. The network interface NI could include a wired or wireless technology.

STS and STS-ICS Computer Operating Environment

Figure 8:
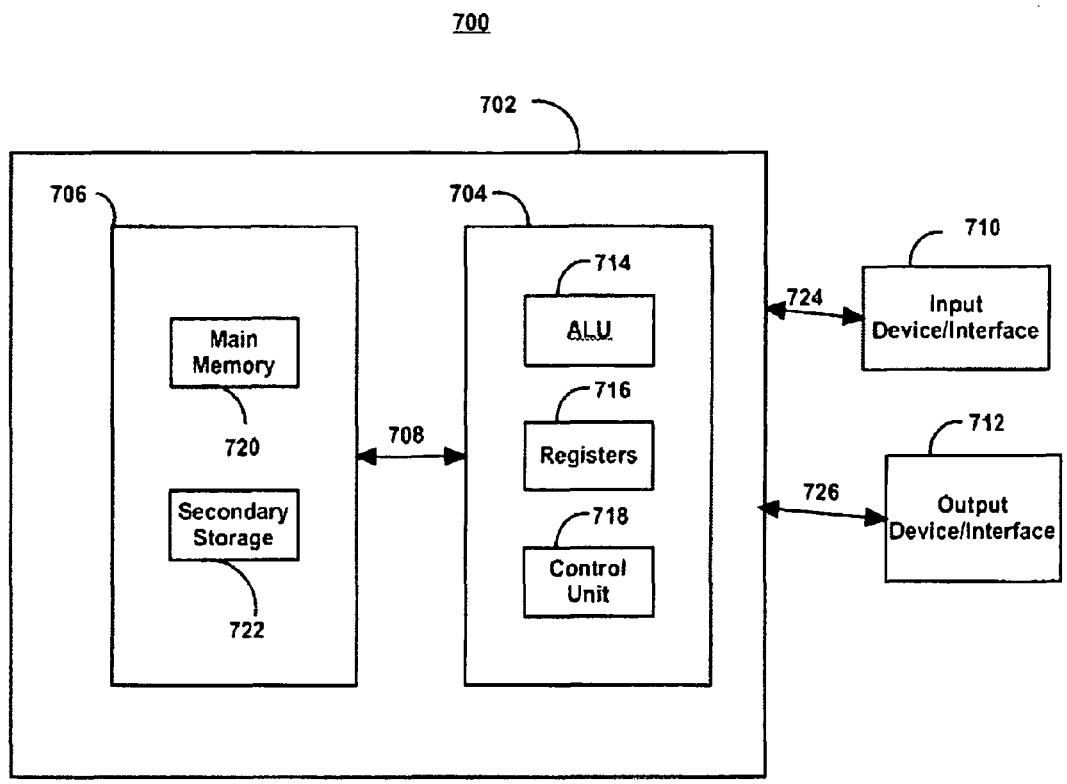
FIG. 8 is a block diagram of a computer system that may be used to implement a method and apparatus embodying the disclosures.

Referring to FIG. 8, an operating environment for an illustrated embodiment of one or more tag readers, or participant/tag detection system and supporting timing systems as described herein is a computer system 500 with a computer 502 that comprises at least one high speed central processing unit (CPU) 704, in conjunction with a memory system 506 interconnected with at least one bus structure 508, an input device 510, and an output device 512. These elements are interconnected by at least one bus structure 508. As addressed above, the input and output devices can include a communication interface including an antenna interface. Any or all of the computer components of the STS system including the STS-ICS network interface and communications systems and methods can be any computing device including, but not limited to, a lap top, PDA, Cell/mobile phone, as well as potentially a dedicated device. The software can be implemented as any "app" thereon and still be within the scope of this disclosure.

The illustrated CPU 704 for an STS-ICS, tag reader or detection system is of familiar design and includes an arithmetic logic unit (ALU) 514 for performing computations, a collection of registers for temporary storage of data and instructions, and a control unit 516 for controlling operation of the computer system 500. Any of a variety of processors, including at least those from Digital Equipment, Sun, MIPS, Motorola, NEC, Intel, Cyrix, AMD, HP, and Nexgen, is equally preferred but not limited thereto, for the CPU 504. This illustrated embodiment operates on an operating system designed to be portable to any of these processing platforms.

The memory system 506 generally includes high-speed main memory 520 in the form of a medium such as random access memory (RAM) and read only memory (ROM) semiconductor devices that are typical on a STS-ICS, tag reader or detection system. However, the present disclosure is not limited thereto and can also include secondary storage 522 in the form of long term storage mediums such as floppy disks, hard disks, tape, CD-ROM, flash memory, etc., and other devices that store data using electrical, magnetic, and optical or other recording media. The main memory 520 also can include, in some embodiments, a video display memory for displaying images through a display device (not shown). Those skilled in the art will recognize that the memory system 506 can comprise a variety of alternative components having a variety of storage capacities.

Where applicable, an input device 510, and output device 512 can also be provided in the STS-ICS, tag reader or detection system. The input device 510 can comprise any keyboard, mouse, physical transducer (e.g. a microphone), and can be interconnected to the computer 502 via an input interface 524, such as a graphical user interface, associated with or separate from the above described communication interface including the antenna interface for wireless communications. The output device 512 can include a display, a printer, a transducer (e.g. a speaker), etc, and be interconnected to the computer 502 via an output interface 526 that can include the above described communication interface including the antenna interface. Some devices, such as a network adapter or a modem, can be used as input and/or output devices.

As is familiar to those skilled in the art, the computer system 500 further includes an operating system and at least one application program. The operating system is the set of software which controls the computer system's operation and the allocation of resources. The application program is the set of software that performs a task desired by an STS user, using computer resources made available through the operating system. Both are typically resident in the illustrated memory system 306 that may be resident on the STS-ICS, tag reader or detection system.

In accordance with the practices of persons skilled in the art of computer programming, the present disclosure is described below with reference to symbolic representations of operations that are performed by the computer system 500. Such operations are sometimes referred to as being computer-executed. It will be appreciated that the operations which are symbolically represented include the manipulation by the CPU 504 of electrical signals representing data bits and the maintenance of data bits at memory locations in the memory system 506, as well as other processing of signals. The memory locations where data bits are maintained are physical locations that have particular electrical, magnetic, or optical properties corresponding to the data bits. One or more embodiments can be implemented in tangible form in a program or programs defined by computer executable instructions that can be stored on a computer-readable medium. The computer-readable medium can be any of the devices, or a combination of the devices, described above in connection with the memory system 506.

As described herein, the STS-ICS provides a communication architecture for bi-directional timing systems communications between multiple implementing interfaces over a data communication network. One or all of the STS-ICS systems may be separate STS systems wherein the STS-ICS enables each to share its sports timing system data and participant information with the other systems.

As described herein, the STS-ICS includes the STS-ICS communication protocol and communication messaging structure. Some of these STS system can include systems that detect and collect the participant data. Some of the STS-ICS systems may not be STS systems but may be systems or applications that can be considered sports timing auxiliary systems (STAS) in that they provide auxiliary applications that can utilize the STS-ICS communications for providing real-time sport or event or participant related services including real-time participant and event information collection and reporting and event and participant focused services.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

What is claimed is:

1. A system for communicating in real time sporting event participant information with a sport timing system (STS) configured to utilize and communicate with a participant detection system that is remotely located from the sports timing system wherein the participant detection system detects a participants proximity to an event detection point and identifies a participant identifier and determines a plurality of different detection times associated with said detection and transmits participant detection data including the identified participant identifier and the determined detection times to the STS, the system comprising:

the sports timing system (STS) comprising
a participant detection system communication interface communicatively coupled via a first communication network to the participant detection system wherein the participant detection system communication interface receives from the participant detection system the participant detection data that includes the participant identifier and the plurality of different detection times;
a processor configured for executing computer executable instructions;
a memory storing the computer executable instructions and a unique sport timing system (STS) identifier referring to the STS and coupled to the processor for providing the computer executable instructions to the processor,
the computer executable instructions including a database application for storing the unique STS identifier and a plurality of participant data in the memory, each participant data of the plurality of participant data including a registered participant identifier for uniquely identifying each of a plurality of participants, one or more personal data associated with each participant of the plurality of participants, and a participant timing data that includes the received plurality of different detection times for each of the plurality of participants in proximity to the event detection point and a determined time of passing, the computer executable instructions including determining the time of passing that a particular participant passed the event detection point responsive to the received plurality of detection times for the particular participant;
a data interface coupled to the processor and the memory and communicatively coupled to a second data communication network, the computer executable instructions causing the data interface of the STS to communicate over the second data communication network with a remote STS using a stateless broadcast variable length packet protocol transmitting a plurality of predefined multicast and unicast messages each of which is an application level message, the transmitted multicast and unicast messages including at least one of the unique STS identifier, a portion of the participant data and the determined time of passing for the particular participant,
wherein the multicast application level messages include an identification of the STS but do not include an identification of the remote STS, the multicast application level messages including each of an announcement message, an announce message for lap events message, a no announcement message, a time synchronization message, a remote signal verification message and a refresh display message.

2. The system of claim 1 wherein the STS is a first sports timing system and the participant detection system is a first participant detection system positioned at a first event detection point, further comprising the remote STS as a second sports timing system having a second unique STS identifier and receiving second participant detection data from a second participant detection system positioned at a second event detection point and with a second data interface to communicate over the data communication network using the stateless broadcast variable length packet protocol and using the plurality of predefined multicast and unicast messages including the portion of the participant data, and receiving the transmitted multicast and unicast messages from the first sports timing system and transmitted second multicast and unicast messages including at least the second unique STS identifier.

3. The system of claim 1, further comprising the STS having a timing clock providing a present time signal, wherein a plurality of participant detection data having the plurality of different detection times with the same participant identifier are received and stored and wherein the executable instructions include a set of instructions to cause the processor to determine the time of passing responsive to the plurality of received detections times as provided by the plurality of participant detection data and the present time signal.

4. The system of claim 1 wherein at least one of the multicast messages includes a read message having the STS identifier, the participant identifier, the determined time of passing, and a uniquely assigned packet number.

5. The system of claim 1 wherein at least a portion of the predefined application level messages include a uniquely assigned packet number that is a next sequential number for the data interface.

6. The system of claim 1 wherein the data interface including transmitting as one of the unicast application level messages a unicast lookup information message having the STS identifier, a particular participant data in text format, a remote STS identifier, and a different uniquely assigned packet number that is a next sequential number for the data interface.

7. The system of claim 1 wherein the unicast application level messages includes an identification of the STS and an identification of the remote STS the unicast messages including a message re-announcement message, a start remote STS message, a stop remote STS message, a request image message, a sent image message, a request directory message, a sent directory message, a request an image stream on message, and a request an image stream off message.

8. The system of claim 1 wherein the data interface includes communicating using the stateless broadcast protocol having one or more application level broadcast messages, each broadcast message not including an identification of the STS system or an identification of the remote STS.

9. The system of claim 2 wherein the first sports timing system transmits in the multicast or unicast messages a portion of the participant data that is stored in the first memory and wherein the second sports timing system receives the transmitted portion of the participant data and stores the received portion of participant data in a second memory.

10. The system of claim 9 wherein the second sports timing system transmits second participant detection data including the participant identifier and the received plurality of detection times as received from the second participant detection system to the first sports timing system and wherein the first sports timing system receives the second participant detection data, wherein the executable instructions include a set of instructions to cause the processor of the first sports timing system to determine event elapsed time for the participant responsive to the received second participant detection data associated with the second event detection point and the determined time of passing of the first event detection point.

11. The system of claim 1 wherein the multicast application level messages include an identification of the STS but do not include an identification of the remote STS, and wherein the unicast messages includes an identification of the STS and an identification of the remote STS.

12. The system of claim 1 wherein the participant detection system is a radio frequency identification device (RFID) tag reading system having one or more RFID tag readers and wherein the received participant detection data at the participant detection system communication interface includes an RFID tag number uniquely assigned to the detected participant.

13. A nontransitory computer readable medium encoded with a set of executable instructions
to cause a sport timing system which is communicatively coupled to a participant detection system that is remotely located from the sport timing system, to perform:
receiving at a participant detection system communication interface, communicatively coupled via a first communication network, participant detection data as transmitted by the participant detection system responsive to the participant detection system detecting a proximity of a participant in a sporting event to an event detection point, the participant detection data including an identified participant identifier and a plurality of different detection times associated with said detection;
storing in a memory the received participant detection data including participant data that includes a participant identifier for uniquely identifying the participant and participant timing data and one or more personal data associated with the participant and a unique sports timing system identifier;
determining a time of passing that the participant passed the event detection point responsive to the received plurality of different detection times; and
transmitting, via a data interface, datagram messages using a stateless broadcast variable length packet protocol over a second data communication network, each of the transmitted datagram messages being one of a plurality of predefined multicast and unicast application level messages, the transmitted datagram messages including at least one of the unique sports timing system identifier, at least a portion of the participant detection data and the determined time of passing,
wherein the multicast application level messages include an identification of the sport timing system but do not include an identification of a remote sport timing system, which is communicatively coupled to the sport timing system, the multicast application level messages including each of an announcement message, an announce message for lap events message, a no announcement message, a time synchronization message, a remote signal verification message and a refresh display message.

14. The computer readable medium of claim 13 having executable instructions for:
providing a present time signal from a timing clock;
wherein the receiving further includes receiving and storing a plurality of participant detection data having the plurality of different detection times with the same participant identifier and
determining in a processor the participant timing data responsive to the received plurality of different detection times and the present time signal.

15. The computer readable medium of claim 13 wherein the participant detection system is an RFID tag reading system having one or more RFID tag readers and wherein the participant detection data includes an RFID tag number uniquely assigned to the detected participant, the executable instructions for:
communicating with the RFID tag reading system and receiving a plurality of the participant detection data including a RFID tag number of the detected participant's RFID tag, each of the received plurality of participant detection data having the same RFID tag number and the plurality of different detection times.

16. The computer readable medium of claim 13 having executable instructions including formatting the multicast datagram messages to not include the stored unique sports timing system identifier in the multicast message but to include an identification of an intended communicatively coupled remote sport timing system, and formatting the unicast messages to include the stored unique sports timing system identifier and to include an identification of the intended remote sport timing system.

17. The computer readable medium of claim 13 having executable instructions for:
formatting one or more broadcast messages to not include the identification of the sport timing system or any identification of an intended remote sport timing system that is communicatively coupled to the sport timing system via the data interface and the second data communication network; and
transmitting via the data interface the one or more broadcast messages.

18. The system of claim 13 wherein the participant detection system communication interface receives a plurality of participant detection data from the participant detection system with each having the same identified participant identifier and each having a different determined detection time, wherein each received participant detection data is stored in the memory and wherein the instructions for determining the time of passing include instructions for determining the time of passing of the participant passed the event detection point as a function of two or more of the plurality of received determined detection times.

19. The method of claim 13 wherein the unicast application level messages includes the identification of the sport timing system and the identification of the remote sport timing system, the unicast messages including a message re-announcement message, a start remote STS message, a stop remote STS message, a request image message, a sent image message, a request directory message, a sent directory message, a request an image stream on message, and a request an image stream off message.

20. A method for communicating sporting event timing information between a first sport timing system and a second sport timing system, wherein at least one of the sport timing systems is configured to utilize and communicate with a participant detection system detecting a proximity of a participant in a sporting event to an event detection point, the participant detection system identifying a participant identifier and determining a plurality of different detection times associated with said detection and transmitting participant detection data including the identified participant identifier and the determined plurality of different detection times, the method comprising:
in a first sport timing system (STS) communicatively coupled to the participant detection system that is remotely located from the first sport timing system:
receiving at a participant detection system communication interface communicatively coupled via a first communication network participant detection data from the participant detection system responsive to the participant detection system detecting the proximity of a participant in the sporting event to the event detection point;
storing in a memory the received participant detection data including participant data that includes the participant identifier for uniquely identifying the participant, participant timing data and one or more personal data associated with the participant and a unique sports timing system identifier associated with the first sport timing system;
determining a time of passing that the participant passed the event detection point responsive to the plurality of different detection times from the received participant detection data; and
transmitting, via a data interface, datagram messages using a stateless broadcast variable length packet protocol over a second data communication network, each of the transmitted datagram messages being one of a plurality of predefined multicast and unicast application level messages, the transmitted datagram messages including at least one of the unique sports timing system identifier, at least a portion of the participant detection data and the determined time of passing,
wherein the multicast application level messages include an identification of the first sport timing system but do not include an identification of the second sport timing system, which is remote and communicatively coupled to the first sport timing system, the multicast application level messages including each of an announcement message, an announce message for lap events message, a no announcement message, a time synchronization message, a remote signal verification message and a refresh display message.

21. The method of claim 20, further comprising:
providing a present time signal from a timing clock;
wherein the receiving further includes receiving a plurality of participant detection data having the plurality of different detection times with the same participant identifier; and
determining in the processor the time of passing of the participant is responsive to the received plurality of different detection times within the plurality of participant detection data and the present time signal.

22. The method of claim 20 wherein the participant detection system is an RFID tag reading system having one or more RFID tag readers and wherein the participant detection data includes an RFID tag number uniquely assigned to the detected participant, the method further comprising:
communicating with the RFID tag reading system and receiving a plurality of the participant detection data including a RFID tag number of the detected participants RFID tag, each of the received plurality of participant detection data having the same RFID tag number and different determined detection times, wherein in the sport timing system receiving the plurality of participant detection data with the plurality of detection times each having the same RFID tag number, and the sport timing system containing instructions to determine the time of passing of the RFID tag number and therefore the participant associated there with responsive to the plurality of detection times.

23. The method of claim 20, further comprising:
formatting the multicast datagram messages to not include the stored unique sports timing system identifier in the multicast message but to include an identification of the intended remote sport timing system that is communicatively coupled to the sport timing system via the data interface and the second data communication network, and
formatting the unicast messages to include the stored unique sports timing system identifier and to include an identification of the intended remote sport timing system.

24. The method of claim 20, further comprising:
formatting one or more application level broadcast message to not include the identification of the sport timing system or any identification of the intended remote sport timing system; and
transmitting via the data interface the one or more broadcast messages.

25. The method of claim 20 wherein one or more of the predefined application level messages includes a uniquely assigned packet number that is a next sequential number for the data interface.

26. A system for communicating in real time sporting event participant information with a sport timing system (STS)

configured to utilize and communicate with a participant detection system that is remotely located from the sports timing system wherein the participant detection system detects a participants proximity to an event detection point and identifies a participant identifier and determines a plurality of different detection times associated with said detection and transmits participant detection data including the identified participant identifier and the determined detection times to the STS, the system comprising:

the sports timing system (STS) comprising
a participant detection system communication interface communicatively coupled via a first communication network to the participant detection system wherein the participant detection system communication interface receives from the participant detection system the participant detection data that includes the participant identifier and the plurality of different detection times;
a processor configured for executing computer executable instructions;
a memory storing the computer executable instructions and a unique sport timing system (STS) identifier referring to the STS and coupled to the processor for providing the computer executable instructions to the processor,
the computer executable instructions including a database application for storing the unique STS identifier and a plurality of participant data in the memory, each participant data of the plurality of participant data including a registered participant identifier for uniquely identifying each of a plurality of participants, one or more personal data associated with each participant of the plurality of participants, and a participant timing data that includes the received plurality of different detection times for each of the plurality of participants in proximity to the event detection point and a determined time of passing, the computer executable instructions including determining the time of passing that a particular participant passed the event detection point responsive to the received plurality of detection times for the particular participant;
a data interface coupled to the processor and the memory and communicatively coupled to a second data communication network, the computer executable instructions causing the data interface of the STS to communicate over the second data communication network with a remote STS using a stateless broadcast variable length packet protocol transmitting a plurality of predefined multicast and unicast messages each of which is an application level message, the transmitted multicast and unicast messages including at least one of the unique STS identifier, a portion of the participant data and the determined time of passing for the particular participant,
wherein the unicast application level messages includes an identification of the STS and an identification of the remote STS, the unicast messages including a message re-announcement message, a start remote STS message, a stop remote STS message, a request image message, a sent image message, a request directory message, a sent directory message, a request an image stream on message, and a request an image stream off message.

27. The system of claim 26 wherein the STS is a first sports timing system and the participant detection system is a first participant detection system positioned at a first event detection point, further comprising the remote STS as a second sports timing system having a second unique STS identifier and receiving second participant detection data from a second participant detection system positioned at a second event detection point and with a second data interface to communicate over the data communication network using the stateless broadcast variable length packet protocol and using the plurality of predefined multicast and unicast messages including the portion of the participant data, and receiving the transmitted multicast and unicast messages from the first sports timing system and transmitted second multicast and unicast messages including at least the second unique STS identifier.

28. The system of claim 26, further comprising the STS having a timing clock providing a present time signal, wherein a plurality of participant detection data having the plurality of different detection times with the same participant identifier are received and stored and wherein the executable instructions include a set of instructions to cause the processor to determine the time of passing responsive to the plurality of received detections times as provided by the plurality of participant detection data and the present time signal.

29. The system of claim 26 wherein the multicast application level messages include an identification of the STS but do not include an identification of the remote STS, the multicast messages including each of an announcement message, an announce message for lap events message, a no announcement message, a time synchronization message, a remote signal verification message and a refresh display message.

30. The system of claim 26 wherein at least a portion of the predefined application level messages include a uniquely assigned packet number that is a next sequential number for the data interface.

31. The system of claim 26 wherein the data interface including transmitting as one of the unicast application level messages a unicast lookup information message having the STS identifier, a particular participant data in text format, a remote STS identifier, and a different uniquely assigned packet number that is a next sequential number for the data interface.

32. The system of claim 26 wherein the data interface includes communicating using the stateless broadcast protocol having one or more application level broadcast messages, each broadcast message not including an identification of the STS or an identification of the remote STS.

33. The system of claim 26 wherein the STS transmits in the multicast or unicast messages a portion of the participant data that is stored in the first memory and wherein the remote STS receives the transmitted portion of the participant data and stores the received portion of participant data in a second memory.

34. The system of claim 33 wherein the remote STS transmits second participant detection data including the participant identifier and the received plurality of detection times as received from the second participant detection system to the STS and wherein the STS receives the second participant detection data, wherein the executable instructions include a set of instructions to cause the processor of the STS to determine event elapsed time for the participant responsive to the received second participant detection data associated with the second event detection point and the determined time of passing of the first event detection point.

35. The system of claim 26 wherein the multicast application level messages include an identification of the STS but do not include an identification of the remote STS, and wherein the unicast messages includes an identification of the STS and an identification of the remote STS.

36. A method for communicating sporting event timing information between a first sport timing system and a second sport timing system, wherein at least one of the sport timing systems is configured to utilize and communicate with a participant detection system detecting a proximity of a participant in a sporting event to an event detection point, the participant detection system identifying a participant identifier and determining a plurality of different detection times associated with said detection and transmitting participant detection data including the identified participant identifier and the determined plurality of different detection times, the method comprising:

in a first sport timing system (STS) communicatively coupled to the participant detection system that is remotely located from the first sport timing system:

receiving at a participant detection system communication interface communicatively coupled via a first communication network participant detection data from the participant detection system responsive to the participant detection system detecting the proximity of a participant in the sporting event to the event detection point;

storing in a memory the received participant detection data including participant data that includes the participant identifier for uniquely identifying the participant, participant timing data and one or more personal data associated with the participant and a unique sports timing system identifier associated with the first sport timing system;

determining a time of passing that the participant passed the event detection point responsive to the plurality of different detection times from the received participant detection data; and transmitting, via a data interface, datagram messages using a stateless broadcast variable length packet protocol over a second data communication network, each of the transmitted datagram messages being one of a plurality of predefined multicast and unicast application level messages, the transmitted datagram messages including at least one of the unique sports timing system identifiers, at least a portion of the participant detection data and the determined time of passing, wherein the unicast application level messages includes an identification of the first sport timing system and an identification of the second sport timing system, which is remote and communicatively coupled to the first sport timing system, the unicast messages including a message re-announcement message, a start remote sports timing system message, a stop remote sports timing system message, a request image message, a sent image message, a request directory message, a sent directory message, a request an image stream on message, and a request an image stream off message.

37. The method of claim 36, further comprising:
providing a present time signal from a timing clock;
wherein the receiving further includes receiving a plurality of participant detection data having the plurality of different detection times with the same participant identifier; and determining in the processor the time of passing of the participant is responsive to the received plurality of different detection times within the plurality of participant detection data and the present time signal.

38. The method of claim 36 wherein the participant detection system is an RFID tag reading system having one or more RFID tag readers and wherein the participant detection data includes an RFID tag number uniquely assigned to the detected participant, the method further comprising: communicating with the RFID tag reading system and receiving a plurality of the participant detection data including a RFID tag number of the detected participant's RFID tag, each of the received plurality of participant detection data having the same RFID tag number and different determined detection times, wherein in the sport timing system receiving the plurality of participant detection data with the plurality of detection times each having the same RFID tag number, and the sport timing system containing instructions to determine the time of passing of the RFID tag number and therefore the participant associated therewith responsive to the plurality of detection times.

39. The method of claim 36, further comprising:
formatting the multicast datagram messages to not include the stored unique sports timing system identifier in the multicast message but to include an identification of an intended remote sport timing system that is communicatively coupled to the sport timing system via the data interface and the second data communication network, and
formatting the unicast messages to include the stored unique sports timing system identifier and to include an identification of the intended remote sport timing system.

40. The method of claim 36, further comprising: formatting one or more application level broadcast message to not include the sport timing system identification or any identification of the intended remote sport timing system; and transmitting via the data interface the one or more broadcast messages.

41. The method of claim 36 wherein one or more of the predefined application level messages includes a uniquely assigned packet number that is a next sequential number for the data interface.

42. The method of claim 36 wherein the multicast application level messages include an identification of the first sport timing system but do not include an identification of the second sport timing system, the multicast messages including each of an announcement message, an announce message for lap events message, a no announcement message, a time synchronization message, a remote signal verification message and a refresh display message.

* * * * *

UNITED STATES PATENT AND TRADEMARK OFFICE
CERTIFICATE OF CORRECTION

| | | |
|---|---|---|
| PATENT NO. | : 9,164,494 B2 | Page 1 of 1 |
| APPLICATION NO. | : 13/521700 | |
| DATED | : October 20, 2015 | |
| INVENTOR(S) | : Kurt S. Hansen | |

It is certified that error appears in the above-identified patent and that said Letters Patent is hereby corrected as shown below:

Title Page, (73)
Replace "Innovation" with --Innovative--

Signed and Sealed this
Twenty-ninth Day of March, 2016

Michelle K. Lee
*Director of the United States Patent and Trademark Office*